(12) United States Patent
Jung et al.

(10) Patent No.: US 8,609,760 B2
(45) Date of Patent: Dec. 17, 2013

(54) BLEND PARTNER WITH NATURAL RUBBER FOR ELASTOMERIC COMPOUNDS

(75) Inventors: Hyun-Dae Jung, Singapore (SG); Khee Sio Yeo, Singapore (SG); Milind Balwant Joshi, Bangalore (IN); Pradeep Pandurang Patki, Bangalore (IN); Bharat Bhushan Sharma, Bangalore (IN); Manjunatha Hanumanthappa, Bangalore (IN)

(73) Assignee: ExxonMobil Chemical Patents Inc., Houston, TX (US)

( * ) Notice: Subject to any disclaimer, the term of this patent is extended or adjusted under 35 U.S.C. 154(b) by 421 days.

(21) Appl. No.: 12/621,020

(22) Filed: Nov. 18, 2009

(65) Prior Publication Data

US 2011/0118404 A1    May 19, 2011

(51) Int. Cl.
| | |
|---|---|
| *C08J 3/22* | (2006.01) |
| *A61K 8/34* | (2006.01) |
| *C08L 51/00* | (2006.01) |
| *C08L 9/00* | (2006.01) |

(52) U.S. Cl.
USPC .................. 524/525; 524/529; 525/232

(58) Field of Classification Search
USPC ................ 524/526, 495, 525, 529; 525/232
See application file for complete search history.

(56) References Cited

U.S. PATENT DOCUMENTS

| | | | |
|---|---|---|---|
| 3,383,435 | A | 5/1968 | Cizek |
| 4,431,755 | A | 2/1984 | Weber et al. |
| 4,472,538 | A | 9/1984 | Kamigaito et al. |
| 4,810,734 | A | 3/1989 | Kawasumi et al. |
| 4,889,885 | A | 12/1989 | Usuki et al. |
| 5,091,462 | A | 2/1992 | Fukui et al. |
| 5,910,523 | A | 6/1999 | Hudson |
| 6,342,565 | B1 | 1/2002 | Cheng et al. |
| 6,881,800 | B2 | 4/2005 | Friedersdorf |
| 6,992,158 | B2 | 1/2006 | Datta et al. |
| 2004/0236042 | A1 | 11/2004 | Datta et al. |
| 2007/0155890 | A1* | 7/2007 | Chen et al. .................. 524/493 |
| 2008/0178981 | A1* | 7/2008 | Agostini et al. ............. 152/517 |
| 2009/0115108 | A1* | 5/2009 | Rodgers et al. .......... 264/331.15 |

FOREIGN PATENT DOCUMENTS

| | | |
|---|---|---|
| DE | 197 26 278 | 1/1998 |
| JP | 11-310643 | 11/1999 |
| JP | 2000-109635 | 4/2000 |
| JP | 2001-9605 | 1/2001 |
| WO | WO 92/02582 | 2/1992 |
| WO | WO 98/53000 | 11/1998 |
| WO | WO 00/01745 | 1/2000 |
| WO | WO 02/36651 | 5/2002 |
| WO | WO 2004/014998 | 2/2004 |

OTHER PUBLICATIONS

Vistamaxx 6102 Data Sheet.*
Vistamaxx 3020 Data Sheet.*
A. Subramaniam, "*Natural Rubber*", Rubber Technology, 1995, pp. 179-208.
P. Prabhu et al., "*Evidence for Ethylene-Propylene Block Copolymer Formation*", Journal of Polymer Science: Polymer Letters Edition, vol. 18, 1980, pp. 389-394.
H.N. Cheng, "$^{13}C$ *NMR Analysis of Ethylene-Propylene Rubbers*", Macromolecules, vol. 17, 1984, pp. 1950-1955.
G.Ver Strate et al., "*Near Momodisperse Ethylene-Propylene Copolymers by Direct Ziegler-Natta Polymerization, Preparation, Characterization, Properties*", Macromolecules, vol. 21, 1988, pp. 3360-3371.
"*Polyamides*", Kirk-Othmer Encyclopedia of Chemical Technology, John Wiley & Sons, $2^{nd}$ edition, vol. 16, 1968, pp. 1-105.
"*Polyalkenamers*", Concise Encyclopedia of Polymer Science, ed. Jacqueline J. Kroschwitz, John Wiley & Sons, 1990, pp. 748-761.
"*Polyamide Fibers*",Encyclopedia of Polymer Science and Technology, John Wiley &Sons, vol. 10, 1969, pp. 392-414.
L.R. Rudnick et al., "*Synthetic Lubricants and High-Performance Functional Fluids*", ed., Marcel Dekker, 1999, pp. 357-392.
J.T. Byers, "*Fillers: Part I: Carbon Black*", Rubber Technology, $3^{rd}$ Edition, 1995, pp. 59-85.
W.F. Helt et al, "*The Post Vulcanization Stabilization for NR*", Rubber World, vol. 204, No. 5, 1991, pp. 18-23.
A.S. Farid, "*Formulation Design and Curing Characteristics of NBR Mixes for Seals*", Rubber World, vol. 208, No. 6, 1993, pp. 25-30.

* cited by examiner

*Primary Examiner* — Angela C Scott

(57) ABSTRACT

Natural rubber blends, methods for making the same, and articles made therefrom are provided. The natural rubber blend includes at least one propylene copolymer containing ethylene derived units. The natural rubber blend can further include one or more reinforcing fillers, such as carbon black. The presence of the propylene copolymer significantly improves the ozone resistance and ageing properties of the natural rubber gum stock.

10 Claims, 9 Drawing Sheets

US 8,609,760 B2

BLEND PARTNER WITH NATURAL RUBBER FOR ELASTOMERIC COMPOUNDS

BACKGROUND OF THE INVENTION

1. Field of the Invention

Embodiments described herein generally relate to blends of natural rubber. More particularly, embodiments described herein relate to blends or natural rubber and propylene copolymer(s).

2. Description of the Related Art

Traditional natural rubber tends to become sticky over a period of time and exhibits loss of functionality. Consumer products made of natural rubber also require a large amount of filler to enhance physical properties. There is a need, therefore, for a blend partner that is compatible with natural rubber to improve its properties and add value to its service.

SUMMARY OF THE INVENTION

Natural rubber blends, methods for making the same, and articles made therefrom are provided. In at least one specific embodiment, the natural rubber blend comprises natural rubber, and of from about 5 to about 30 phr one or more propylene copolymers. The one or more propylene copolymers comprises at least 8 wt % ethylene and has a melting temperature (Tm) of from 60° C. to 105° C.; a heat of fusion of about 40 J/g to about 80 J/g, and MFR (ASTM-1238D, 2.16 kg, 230° C.) of about 8 g/10 min to about 50 g/10/min. In at least one specific embodiment, the natural rubber blend comprises one or more reinforcing fillers, natural rubber, and of from about 5 to about 30 phr one or more propylene copolymers. The one or more propylene copolymers comprises at least 8 wt % ethylene and has a melting temperature (Tm) of from 60° C. to 105° C.; a heat of fusion of about 40 J/g to about 80 J/g, and MFR (ASTM-1238D, 2.16 kg, 230° C.) of about 8 g/10 min to about 50 g/10/min. Preferably, the one or more reinforcing fillers comprises carbon black.

BRIEF DESCRIPTION OF THE DRAWINGS

So that the recited features of the present invention can be understood in detail, a more particular description of the invention, briefly summarized above, can be had by reference to embodiments, some of which are illustrated in the appended drawings. It is to be noted, however, that the appended drawings illustrate only typical embodiments of this invention and are therefore not to be considered limiting of its scope, for the invention can admit to other equally effective embodiments.

DETAILED DESCRIPTION

Figure 1:
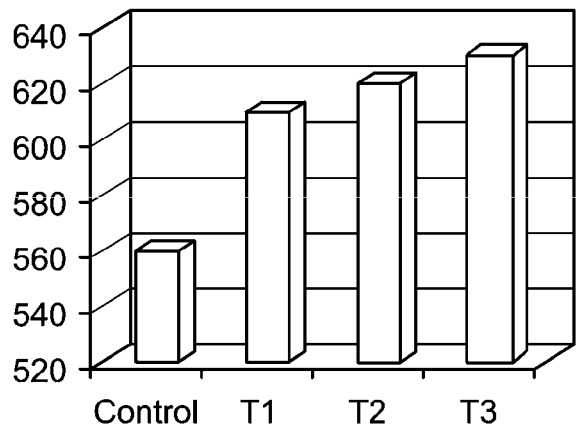
FIG. 1 graphically depicts ultimate elongation for the control example and Examples T1-T3.

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with available information and technology.

A natural rubber blend and method for making the same are provided. The blend includes natural rubber and at least one propylene copolymer, and is suitable for long term use. The natural rubber blend provides significant improvement in ageing and ozone resistance. The natural rubber blend also shows excellent oil retention, which allows high filler loading resulting in significant cost savings.

Any natural rubber can be used. Natural rubber is a polymer of isoprene (methylbuta-1,3-diene) but is distinguished from synthetic polyisoprene which is the product of a metallic catalyst reaction. Natural rubber is a polyterpene synthesized in vivo via enzymatic polymerization of isopentenyl pyrophosphate. Isopentenyl pyrophosphate undergoes repeated condensation to yield cis-polyisoprene via the enzyme rubber transferase. Structurally, cis-polyisoprene is a highly stereoregular polymer with an —OH group at the alpha terminal and three to four trans units at the omega end of the molecule. The molecular weight of natural rubber can vary from about 100,000 to about 1,000,000, and the polydispersity or molecular weight distribution (MWD: Mw/Mn) can be as high as 9.0.

Suitable natural rubbers can also include depolymerized natural rubber, grafted methyl methacrylate natural rubber, oil-extended natural rubber, deproteinized natural rubber, epoxidized natural rubber, thermoplastic natural rubber, superior processing natural rubber, vulcanized natural rubber, and other natural rubbers. For example, natural rubber can be depolymerized to produce a liquid, low molecular weight rubber that can be used as a reactive plasticizer, processing aid, and/or base polymer. Molecular weights can range between 40,000 and 50,000. The low molecular weight rubber is a liquid at room temperature but can also be provided on a silica carrier. Depolymerized natural rubber can be used in flexible molds for ceramics, binders for grinding wheels, and sealants. It is susceptible to oxidation and, therefore, can require appropriate compounding techniques for adequate aging resistance. Liquid natural rubber can be produced by a combination of mechanical milling, heat, and the addition of one or more chemical peptizers.

Three grades of rubber with different levels of grafted methyl methacrylate are commercially available (Heveaplus MG 30, 40, and 49). These grafted methyle methacrylate rubbers are prepared by polymerizing 30, 40, and 49 parts of methyl methacrylate, respectively, in the latex before coagulation. These rubbers have found application primarily in adhesives due to the effectiveness of the polar methacrylate group and nonpolar isoprene bonding dissimilar surfaces. Such polymers tend to have very high hardness (International Rubber Hardness Degrees, IRHD), with values of up to about 96 and have thus had no application in pneumatic tires. When blended with regular grades of natural rubber such as RSS2, vulcanizates with high stiffness are attained but display Mooney viscosities ranging from about 60 to about 80 at typical processing temperatures.

Oil-extended natural rubber (OENR) can be produced by one of several methods. One exemplary method can include cocoagulation of latex with an oil emulsion prior to coagulation or with the dried field coagulum; Banbury mixing of the oil and rubber; and soaking of the rubber in oilpans followed by milling to facilitate further incorporation and sheeting. Both aromatic and naphthenic oils can be used at a loading typically of about 65 parts per hundred pounds of rubber ("phr"). When compounded, filler loading can be higher than those typically found in non-oil extended rubber. The ratio of rubber to oil and oil type are denoted by a code that would read, for example, OENR 75/25N for a 75% rubber, 25% naphthenic oil material.

Deproteinized natural rubber can be produced by treating natural rubber latex with an enzyme that breaks down naturally occurring proteins and other nonrubber material into water-soluble residues. The residues can then be washed out of the rubber to leave a polymer with low sensitivity to water. Typically, natural rubber contains around 0.4% nitrogen as protein; deproteinized rubber contains typically 0.07%. Deproteinized natural rubber has found application in medical gloves to protect workers from allergic reactions and in automotive applications, seals, and bushings. Deproteinized natural rubber displays a low creep, exhibits strain relations, and enables greater control of product uniformity and consistency.

Epoxidized natural rubber, compared with natural rubber, can exhibit improved oil resistance, damping, and reduced gas permeability. However, epoxidized natural rubbers can have a reduced tear strength compared to natural rubber, which has prevented its use in pneumatic tires. At least two grades of epoxidized natural rubber are available, ENR 25 and ENR 50, which are 25 mol % epoxidized and 50% epoxidized, respectively. Epoxy groups are randomly distributed along the polymer chain. Calcium stearate can be used as a stabilizer. These expoxidized natural rubbers provide a number of advantages such as improved oil resistance (ENR 50 is comparable to polychloroprene), low gas permeability equivalent to that of butyl rubber, and compatibility with PVC. When compounded with silica, epoxidized natural rubber has reinforcement properties equivalent to those of carbon black but without the use of silane coupling agents.

Natural rubber blended with polypropylene, for example, provides what is commonly referred to as a thermoplastic natural rubber material. Other natural rubbers can include a mixture or blend of two types of natural rubber with one natural rubber cross-linked, which can be referred to as Superior Processing Rubber. Superior Processing Rubber can be prepared by blending vulcanized latex with diluted field latex in levels according to the grade being prepared (SP 20, SP 40, SP 50 with 20%, 40%, and 50% cross-linked phase, respectively). Two grades are also commercially available (PA 57 and PA 80), which have a processing aid added to further facilitate factory handling. These two grades contain 80% cross-linked rubber and display high stiffness with good flow and process qualities.

Vulcanized natural rubber, often referred to as ebonite, can be prepared by vulcanizing natural rubber with high levels of sulfur. True vulcanized natural rubber, ebonite has a Young's modulus of 500 MPa and Shore D hardness of typically 75. The term "pseudoebonite" has been used to describe rubber with a Shore A hardness, or International Rubber Hardness degrees (IRHD), of 98 or Shore D hardness of 60. Ebonite has a sulfur content of 25-50 phr, and resins may also be used to obtain the required hardness or meet any desired compounding constraints. The principal use of ebonite materials is in battery boxes, linings, piping valves, pumps, and coverings for rollers, where chemical and corrosion resistance is required.

In one or more specific embodiments, the natural rubber can be selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646. Additional details of suitable natural rubbers is described by Subramanian in Rubber Technology 179-208 (1995).

The natural rubber blend can further include synthetic rubber, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-alkylstyrene), preferably isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof. Some commercial examples of synthetic rubbers include NATSYN™ (Goodyear Chemical Company), and BUDENE™ 1207 or BR 1207 (Goodyear Chemical Company). A suitable ethylene-propylene rubber is commercially available as VISTALON™ (ExxonMobil Chemical Company).

The propylene copolymer or simply "PCP" can be any one or more copolymers of propylene-derived units and one or more comonomer units derived from ethylene or a $C_4$-$C_{10}$ α-olefin. Suitable propylene copolymers can optionally further include one or more comonomer diene-derived units. The overall comonomer content of the copolymer is within the range from 5 to 35 wt % in one embodiment. In some embodiments, where more than one comonomer is present, the amount of a particular comonomer can be less than 5 wt %, but the combined comonomer content can be of from about 5 wt % to about 35 wt %.

The propylene copolymer can be either a random copolymer (the comonomer-derived units are randomly distributed along the polymer backbone) or a block copolymer (the comonomer-derived units occur along long sequences), or any variation thereof (having some properties of each). The presence of randomness or "blocky-ness" in a copolymer can be determined by $^{13}C$ NMR as is known in the art and described in, for example, 18 J. POLY. SCI: POLY. LETT. ED. 389-394 (1980).

In certain embodiments, the propylene copolymer comprises ethylene or C4-C10 α-olefin-derived units (or "comonomer-derived units") within the range from 5 or 7 or 8 or 10 to 18 or 20 or 25 or 32 or 35 wt % by weight of the copolymer. The propylene copolymer can also comprise two different comonomer-derived units. Also, these copolymers and terpolymers can comprise diene-derived units as described below. In a particular embodiment, the propylene copolymer comprises propylene-derived units and comonomer units selected from ethylene, 1-hexene and 1-octene. And in a more particular embodiment, the comonomer is ethylene, and thus the propylene copolymer is a propylene-ethylene copolymer.

In one embodiment, the propylene copolymer comprises from less than 10 wt % or 8 wt % or 5 wt % or 3 wt %, by weight of the copolymer or terpolymer, of diene derived units (or "diene"), and within the range from 0.1 wt % or 0.5 wt % or 1 wt % to 5 wt % or 8 wt % or 10 wt % in yet another embodiment. Suitable dienes include for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene, if present, is most preferably ENB.

In certain embodiments, the propylene copolymers have a triad tacticity of three propylene units, as measured by 13C NMR, from greater than 75% or 80% or 82% or 85% or 90%. In one embodiment, the triad tacticity is within the range from 50% to 99%, and from 60% to 99% in another embodiment, and from 75% to 99% in yet another embodiment, and from 80% to 99% in yet another embodiment; and from 60% to 97% in yet another embodiment. Triad tacticity is determined as follows: The tacticity index, expressed herein as "m/r", is determined by 13C nuclear magnetic resonance (NMR). The tacticity index m/r is calculated as defined by H. N. Cheng in 17 Macromolecules 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically can have a ratio approaching infinity, and many by-product atactic polymers have sufficient isotactic content to result in ratios from greater than 50. Embodiments of the propylene copolymer have a tacticity index m/r within the range from 4 or 6 to 8 or 10 or 12.

In certain embodiments, the propylene copolymers have a heat of fusion (Hf), determined according to the Differential Scanning calorimetry (DSC) procedure described herein, within the range from 0.5 or 1 or 5 J/g, to 35 or 40 or 50 or 65 or 75 J/g. In certain embodiments, the Hf value is from less than 75 or 65 or 55 J/g.

In certain embodiments, the propylene copolymers have a percent crystallinity within the range from 0.5% to 40%, and from 1% to 30% in another embodiment, and from 5% to 25% in yet another embodiment, wherein "percent crystallinity" is determined according to the DSC procedure described herein. (The thermal energy for the highest order of polypropylene is estimated at 189 J/g (i.e., 100% crystallinity is equal to 189 J/g)). In another embodiment, the propylene copolymer has a percent crystallinity from less than 40% or 25% or 22% or 20%.

In certain embodiments, the propylene copolymers have a single peak melting transition as determined by DSC; in certain embodiments the propylene copolymer has a primary peak melting transition from less than 90° C., with a broad end-of-melt transition from greater than about 110° C. The peak "melting point" (Tm) is defined as the temperature of the greatest heat absorption within the range of melting of the sample. However, the propylene copolymer can show secondary melting peaks adjacent to the principal peak, and/or the end-of-melt transition, but for purposes herein, such secondary melting peaks are considered together as a single melting point, with the highest of these peaks being considered the Tm of the propylene copolymer. The propylene copolymers have a peak melting temperature (Tm) from less than 70° C. or 80° C. or 90° C. or 100° C. or 105° C. in certain embodiments; and within the range from 10° C. or 15° C. or 20° C. or 25° C. to 65° C. or 75° C. or 80° C. or 95° C. or 105° C. in other embodiments.

The procedure for DSC determinations is as follows. About 0.5 grams of polymer was weighed out and pressed to a thickness of about 15-20 mils (about 381-508 microns) at about 140° C.-150° C., using a "DSC mold" and Mylar™ as a backing sheet. The pressed pad was allowed to cool to ambient temperature by hanging in air (the Mylar was not removed). The pressed pad was annealed at room temperature (about 23° C.-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene copolymers have a density within the range from 0.840 g/cm$^3$ to 0.920 g/cm$^3$, and from 0.845 g/cm$^3$ to 0.900 g/cm$^3$ in another embodiment, and from 0.850 g/cm$^3$ to 0.890 g/cm$^3$ in yet another embodiment, the values measured at room temperature per the ASTM D-1505 test method.

In certain embodiments, the propylene copolymers have a Shore A hardness (ASTM D2240) within the range from 10 or 20 to 80 or 90 Shore A. In yet another embodiment, the propylene copolymers possess an Ultimate Elongation from greater than 500% or 1000% or 2000%; and within the range from 300% or 400% or 500% to 800% or 1,200% or 1,800% or 2,000 or 3,000% in other embodiments.

In certain embodiments, the propylene copolymers have a weight average molecular weight (Mw) value within the range from 20,000 to 5,000,000 g/mole, and from 50,000 to 1,000,000 g/mole in another embodiment, and from 70,000 to 400,000 g/mole in yet another embodiment. In another embodiment, the propylene copolymers have a number average molecular weight (Mn) value within the range from 4,500 to 2,500,000 g/mole, and from 20,000 to 250,000 g/mole in yet another embodiment, and from 50,000 to 200,000 g/mole in yet another embodiment. In yet another embodiment, the propylene copolymers have a z-average molecular weight (Mz) value within the range from 20,000 to 7,000,000 g/mole, and from 100,000 to 700,000 g/mole in another embodiment, and from 140,000 to 500,000 g/mole in yet another embodiment.

In certain embodiments, the propylene copolymers have a melt flow rate ("MFR," ASTM D1238, 2.16 kg, 230° C.), from less than 90 or 70 or 50 or 40 or 30 or 20 or 10 dg/min, and within the range from 0.1 or 0.5 or 1 or 5 or 10 to 20 or 30 or 40 or 50 or 70 or 90 dg/min in other embodiments.

In certain embodiments, a desirable molecular weight (and hence, a desirable MFR) is achieved by visbreaking the propylene copolymers. The "visbroken propylene copolymers" (also known in the art as "controlled rheology" or "CR") is a copolymer that has been treated with a visbreaking agent such that the agent breaks apart the polymer chains. Non-limiting examples of visbreaking agents include peroxides, hydroxylamine esters, and other oxidizing and free-radical generating agents. Stated another way, the visbroken copolymer can be the reaction product of a visbreaking agent and the copolymer. In particular, a visbroken propylene copolymer is one that has been treated with a visbreaking agent such that its MFR is increased, in one embodiment by at least 10%, and at least 20% in another embodiment relative to the MFR value prior to treatment.

In certain embodiments, the molecular weight distribution (MWD) of the propylene copolymers is within the range from 1.5 or 1.8 or 2.0 to 3.0 or 3.5 or 4.0 or 5.0 or 10.0 in particular embodiments. Techniques for determining the molecular weight (Mn, Mz and Mw) and molecular weight distribution (MWD) are as follows, and as by Verstate et al. in 21 Macromolecules 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804 and 805 are used. This technique is discussed in Liquid Chromatography of Polymers and Related Materials III 207 (J. Cazes ed., Marcel Dekker, 1981). No corrections for column spreading were employed; however, data on generally accepted standards, for example, National Bureau of Standards, Polyethylene (SRM 1484) and anionically produced hydrogenated polyisoprenes (an alternating ethylene-propylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene copolymers can be produced using any catalyst and/or process known for producing polypropylenes. In certain embodiments, the propylene copolymers can include copolymers prepared according to the procedures in WO 02/36651, U.S. Pat. No. 6,992,158, and/or WO 00/01745. Preferred methods for producing the propylene copolymers are found in US Patent Application Publication 2004/0236042 and U.S. Pat. No. 6,881,800. Preferred propylene-based polyolefin polymers are available commercially under the trade names VISTAMAXX™ (ExxonMobil Chemical Company, Houston, Tex., USA) and VERSIFY™ (The Dow Chemical Company, Midland, Mich., USA), certain grades of TAFMER™ XM or NOTIO™ (Mitsui Company, Japan) or certain grades of SOFTELL™ (Lyondell Basell Polyolefine GmbH, Germany). A commercial example of an ethylene-based polyolefin copolymer is INFUSE™ olefin block copolymers (Dow Chemical).

Thermoplastic Resin

The natural rubber blend can optionally include one or more thermoplastic resins. The thermoplastic resin can be any material that is not a "rubber" and that is a polymer or polymer blend considered by persons skilled in the art as being thermoplastic in nature, e.g. a polymer that softens when exposed to heat and returns to it original condition when cooled to room temperature. The thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the thermoplastic resin is unvulcanized or non cross-linked.

In one or more embodiments, the thermoplastic resin contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or syndiotactic sequences, or both. The polypropylene can have a high MFI (e.g., from a low of 10, or 15, or 20 g/10 min to a high of 25 to 30 g/10 min. Others have a lower MFI, e.g., "fractional" polypropylenes which have an MFI less than 1.0. Those with high MFI can be preferred for ease of processing or compounding.

In one or more embodiments, the thermoplastic resin is or includes isotactic polypropylene. Preferably, the thermoplastic resin contains one or more crystalline propylene homopolymers or copolymers of propylene having a melting temperature of from 110° C. to 170° C. or higher as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such thermoplastic resins and methods for making the same are described in U.S. Pat. No. 6,342,565.

The term "random polypropylene" as used herein broadly means a single phase copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

Suitable thermoplastic resins can also include polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof. Suitable thermoplastic polyamides (nylons) can include crystalline or resinous, high molecular weight solid polymers including copolymers and terpolymers having recurring amide units within the polymer chain. Polyamides can be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Additional examples of satisfactory polyamides (especially those having a softening point below 275° C.) are described in 16 Encyclopedia of Chemical Technology 1-105 (John Wiley & Sons 1968), Concise Encyclopedia of Polymer Science and 748-761 (John Wiley & Sons, 1990), and 10 Encyclopedia of Polymer Science and Technology 392-414 (John Wiley & Sons 1969). Commercially available thermoplastic polyamides can be advantageously used with linear crystalline polyamides having a softening point or melting point between 160° C. and 260° C. being preferred.

Suitable thermoplastic polyesters can further include the polymer reaction products of one or a mixture of aliphatic or aromatic polycarboxylic acids esters of anhydrides and one or a mixture of diols. Examples of satisfactory polyesters include poly (trans-1,4-cyclohexylene $C_{2-6}$ alkane dicarboxylates such as poly(trans-1,4-cyclohexylene succinate) and poly(trans-1,4-cyclohexylene adipate); poly(cis or trans-1,4-cyclohexanedimethylene) alkanedicarboxylates such as poly(cis-1,4-cyclohexanedimethylene) oxalate and poly(cis-1,4-cyclohexanedimethylene) succinate, poly ($C_{2-4}$ alkylene terephthalates) such as polyethyleneterephthalate and polytetramethylene-terephthalate, poly($C_{2-4}$ alkylene isophthalates such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic resins which can be used are well known, commercially available materials produced by the oxidative coupling polymerization of alkyl substituted phenols. They are generally linear, amorphous polymers having a glass transition temperature in the range of 190° C. to 235° C. These polymers, their method of preparation and compositions with polystyrene are further described in U.S. Pat. No. 3,383,435.

The thermoplastic resins can further include the polycarbonate analogs of the polyesters described above such as segmented poly(ether co-phthalates); polycaprolactone polymers; styrene resins such as copolymers of styrene with less than 50 mol % of acrylonitrile (SAN) and resinous copolymers of styrene, acrylonitrile and butadiene (ABS); sulfone polymers such as polyphenyl sulfone; copolymers and homopolymers of ethylene and $C_2$ to $C_8$ α-olefins, in one or more embodiments a homopolymer of propylene derived units, and in one or more embodiments a random copolymer or block copolymer of ethylene derived units and propylene derived units, and like thermoplastic resins as are known in the art.

The natural rubber blend can include up to 49 wt % thermoplastic resin. In one or more embodiments, the natural rubber blend can contain of from 0.5 to 45 wt % thermoplastic resin. In one or more embodiments, the natural rubber blend can contain of from 2 to 35 wt % thermoplastic resin. In one or more embodiments, the natural rubber blend can contain of from 5 to 30 wt % thermoplastic resin. In one or more embodiments, the natural rubber blend can contain of from 10 to 25 wt % thermoplastic resin.

Processing Aids

The natural rubber blend can optionally include one or more processing aids. Suitable processing aids can include, but are not limited to, plasticizers, tackifiers, extenders, chemical conditioners, homogenizing agents and peptizers such as mercaptans, petroleum and vulcanized vegetable oils, mineral oils, parraffinic oils, polybutene oils, naphthenic oils, aromatic oils, waxes, resins, rosins, or other synthetic fluids having a lower pour point, lower emission, etc., compared to paraffinic or mineral oil and the like. Some commercial examples of processing aids are SUNDEX™ (Sun Chemicals) and FLEXON™ (ExxonMobil Chemical Company).

Preferred plasticizers include polyalphaolefins (PAOs), high purity hydrocarbon fluid compositions (HPFCs) and Group III basestocks such as those described in WO 2004/014998. Preferred PAOs include oligomers of decene and co-oligomers of decene and dodecene. Preferred PAOs are available under the trade name SuperSyn™, SpectraSyn™ PAO, and ELEVASTT™ from ExxonMobil Chemical Company.

Suitable polybutene oils have an Mn of less than 15,000 g/mol. Preferred polybutene oils also include homopolymer or copolymer of olefin derived units having from 3 to 8 carbon atoms, preferably from 4 to 6 carbon atoms. In yet another embodiment, the polybutene is a homopolymer or copolymer of a $C_4$ raffinate. An embodiment of preferred low molecular weight polymers termed "polybutene" polymers is described in, for example, Synthetic Lubricants and High-Performance Functional Fluids 357-392 (Leslie R. Rudnick & Ronald L. Shubkin, ed., Marcel Dekker 1999) (hereinafter "polybutene processing oil" or "polybutene").

In one or more embodiments, the polybutene oil can be a copolymer comprising at least isobutylene derived units, and optionally 1-butene derived units, and/or 2-butene derived units. In one or more embodiments, the polybutene is a homopolymer if isobutylene, or a copolymer of isobutylene and 1-butene or 2-butene, or a terpolymer of isobutylene and 1-butene and 2-butene, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In one or more embodiments, the polybutene is a copolymer or terpolymer wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils typically have a number average molecular weight (Mn) of less than 10,000 g/mol, less than 8,000 g/mol, or less than 6,000 g/mol. In one or more embodiments, the polybutene oil has a number average molecular weight of greater than 400 g/mol, and greater than 700 g/mol, or greater than 900 g/mol. A preferred embodiment can be a combination of any lower limit with any upper limit herein. For example, in one or more embodiments of the polybutene described, the polybutene has a number average molecular weight of from 400 g/mol to 10,000 g/mol, and from 700 g/mol to 8,000 g/mol. Useful viscosities of the polybutene processing oil ranges from 10 to 6,000 cSt (centistokes) at 100° C., or from 35 to 5,000 cSt at 100° C., or is greater than 35 cSt at 100° C., or is greater than 100 cSt at 100° C.

The natural rubber blend can include one or more types of polybutene as a mixture, blended either prior to addition to the elastomer, or with the elastomer. The amount and identity (e.g., viscosity, Mn, etc.) of the polybutene processing oil mixture can also be varied to achieve some other viscosity or molecular weight. In this manner, the physical properties of the composition can be controlled. More particularly, the phrases "polybutene processing oil", or "polybutene processing oils" include a single oil or a composition of two or more oils used to obtain any viscosity or molecular weight (or other property) desired, as specified in the ranges disclosed herein.

The processing oil or oils can be present in the natural rubber blend described from 1 to 70 phr; or from 2 to 60 phr; or from 4 to 35 phr; or from 5 to 30 phr. The processing oil or oils can be present in the natural rubber blend described from 1 to 70 phr in one embodiment, from 3 to 60 phr in another embodiment, and from 5 to 50 phr in yet another embodiment.

Fillers

The natural rubber blend can optionally include one or more fillers such as calcium carbonate, clay, mica, silica and silicates, talc, titanium dioxide, starch, and other fillers such as wood flour, and carbon black. The filler components can be present at a level of from 10 to 200 phr of the composition, such as from 40 to 140 phr, or 50 phr to 100 phr. In some embodiments, two or more carbon blacks are used in combination for example Regal 85 is a carbon black that has multiple particle sizes, rather than just one. Combinations also include those where the carbon blacks have different surface areas. Likewise, two different blacks which have been treated differently can also be used. For example, a carbon black that has been chemically treated can be combined with a carbon black that has not. The carbon black not having a surface area of less than 30 m$^2$/g and/or not a dibutylphthalate oil absorption of less than 80 cm$^3$/100 gm can typically be present at a level of from 1 to 200 phr, preferably 10 to 200 phr, preferably 20 to 180 phr, more preferably 30 to 160 phr, and more preferably 40 to 140 phr.

In one or more embodiments, the natural rubber blend can include one or more exfoliated clays. Exfoliated clays, also referred to as "nanoclays," are well known, and their identity, methods of preparation and blending with polymers is disclosed in, for example, JP 2000109635, 2000109605, 11310643; DE 19726278; WO98/53000; U.S. Pat. Nos. 5,091,462, 4,431,755, 4,472,538, and 5,910,523. Swellable layered clay materials can include natural or synthetic phyllosilicates, particularly smectic clays such as montmorillonite, nontronite, beidellite, volkonskoite, laponite, hectorite, saponite, sauconite, magadiite, kenyaite, stevensite and the like, as well as vermiculite, halloysite, aluminate oxides, hydrotalcite and the like. These layered clays generally comprise particles containing a plurality of silicate platelets having a thickness of from 4-20 Å or 8-12 Å, bound together and contain exchangeable cations such as Na$^+$, Ca$^{+2}$, K$^+$ or Mg$^{+2}$ present at the interlayer surfaces.

The layered clay can be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{20}$ alkyls or alkenes which can be the same or different. In one or more embodiments, the exfoliating agent is a so called long chain tertiary amine, wherein at least $R_1$ is a $C_{14}$ to $C_{20}$ alkyl or alkene.

Another class of swelling agents includes those which can be covalently bonded to the interlayer surfaces. These include polysilanes of the structure —Si(R')$_2$R$^2$ where R' is the same or different at each occurrence and is selected from alkyl, alkoxy or oxysilane and R$^2$ is an organic radical compatible with the matrix polymer of the composite.

Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

Clay or exfoliated clay can be incorporated in the nanocomposites in an amount sufficient to develop an improvement in the mechanical properties or barrier properties of the nanocomposite, e.g., tensile strength or air/oxygen permeability. Amounts generally will range from 0.5 to 15 wt %; or from 1 to 10 wt %; or from 1 to 5 wt %, based on the polymer content of the nanocomposite. Expressed in parts per hundred pounds of rubber, the clay or exfoliated clay can be present from 1 to 30 phr; or from 3 to 20 phr. In one or more embodiments, the exfoliated clay is an alkylamine-exfoliated clay.

Carbon black can be produced by the incomplete combustion of organic substances. There are two main production processes for the manufacture of carbon black: the oil furnace process and the thermal process. In the furnace process a fuel is burned in an excess of air to produce finely divided carbon. There are several distinct production segments: reaction; filtration and separation; pelletizing; and drying. The thermal process is similar, but is a continuous furnace process. The American Society of Testing Materials (ASTM) has established a carbon black classification system based on particle size and surface oxidation, ASTM D1765. The degree of surface oxidation affects the cure time of carbon-black filled rubber compounds. The "N" denotes normal curing blacks and the "S" refers to slow curing blacks. After N or S, the first number of the three-digit suffix identifies the particle size and the remaining two digits are assigned arbitrarily.

Carbon black owes its reinforcing character in rubber to the size, shape and surface chemistry of the aggregate structures which consists of primary particles essentially spherical in shape that are chemically bonded to one another. The two most important properties of carbon black are surface area and structure. Surface area depends inversely upon the size of the primary particles, and is one measure of the area available for physical interaction with the polymer. Surface area ranges from 10-140 $m^2/g$ with thermal blacks having the lowest values based on nitrogen adsorption (NSA) via ASTM D4820. Surface area is also measured by cetyl trimethylammonium bromide (CTAB) absorption. The structure of carbon black depends upon the size and grouping of these primary particles in the aggregate. The more primary particles in the aggregate, the higher structure of the carbon black due to the more complex shape and void volume (porosity). Structure varies from 35-130 $cm^3/100$ gm as measured by dibutylphthalate (DBP) oil absorption via ASTM D2414. Useful grades of carbon black as described in Rubber Technology 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners or innertubes are N550, N650, N660, N762, N990, and the like.

The compositions can include carbon black having a surface area of less than 35 $m^2/g$ and a dibutylphthalate oil absorption of less than 90 $cm^3/100$ gm. Suitable carbon black can also have a surface area ranging from a low of about 7 $m^2/g$, 10 $m^2/g$, or 15 $m^2/g$ to a high of about 25 $m^2/g$, 30 $m^2/g$ or 35 $m^2/g$. Suitable carbon black can also have a surface area ranging from a low of about 7 $m^2/g$, 10 $m^2/g$, or 23 $m^2/g$ to a high of about 25 $m^2/g$, 26 $m^2/g$ or 28 $m^2/g$. Suitable carbon black can also have a dibutylphthalate oil absorption of at least 25 $cm^3/100$ gm and less than 90 $cm^3/100$ gm, less than 80 $cm^3/100$ gm, 70 $cm^3/100$ gm, 65 $cm^3/100$ gm, or 60 $cm^3/100$ gm. The dibutylphthalate oil absorption of the carbon black can also range from a low of about 30 $cm^3/100$ gm, 35 $cm^3/100$ gm, or 40 $cm^3/100$ gm to a high of about 60 $cm^3/100$ gm, 70 $cm^3/100$ gm, or 80 $cm^3/100$ gm. Suitable carbon blacks can include, but are not limited to N550, N762, N774, N907, N990, Regal 85, and Regal 90.

Curing Agents and Accelerators

The natural rubber blend can optionally include one or more other components and additives customarily used in rubber mixes, such as pigments, accelerators, cross-linking and curing materials, antioxidants, antiozonants, and fillers. In one or more embodiments, processing aids (resins) such as naphthenic, aromatic or paraffinic extender oils can be present from 1 to 30 phr. In one or more embodiments, naphthenic, aliphatic, paraffinic and other aromatic resins and oils are substantially absent from the composition. By "substantially absent", it is meant that naphthenic, aliphatic, paraffinic and other aromatic resins are present, if at all, to an extent no greater than 2 phr in the composition.

Generally, polymer compositions, e.g., those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR*, Rubber World 18-23 (1991). Cross-linking and curing agents include sulfur, zinc oxide, and fatty acids. Peroxide cure systems can also be used. Generally, polymer compositions can be crosslinked by adding curative molecules, for example sulfur, metal oxides (i.e., zinc oxide), organometallic compounds, radical initiators, etc. followed by heating. In particular, the following are common curatives that will function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., Zn(Stearate)$_2$, Ca(Stearate)$_2$, Mg(Stearate)$_2$, and Al(Stearate)$_3$), or with stearic acid, and either a sulfur compound or an alkylperoxide compound. (See also, *Formulation Design and Curing Characteristics of NBR Mixes for Seals*, Rubber World 25-30 (1993). This method can be accelerated and is often used for the vulcanization of natural rubber blends.

Accelerators include amines, guanidines, thioureas, thiazoles, thiurams, sulfenamides, sulfenimides, thiocarbamates, xanthates, and the like. Acceleration of the cure process can be accomplished by adding to the composition an amount of the accelerant. The mechanism for accelerated vulcanization of natural rubber involves complex interactions between the curative, accelerator, activators and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea.

In one or more embodiments described, at least one curing agent is present from 0.2 to 15 phr, or from 0.5 to 10 phr. Curing agents include those components described above that facilitate or influence the cure of elastomers, such as metals, accelerators, sulfur, peroxides, and other agents common in the art, and as described above.

Processing

The components of the natural rubber blend can be mixed by combining the components in any suitable mixing device such as a Banbury™ mixer, Brabender™ mixer or preferably a mixer/extruder. Mixing can be performed at temperatures up to the melting point of the elastomer and/or rubber used in the composition at a rate sufficient to allow the graphite and/or clay to exfoliate and become uniformly dispersed within the polymer to form the nanocomposite.

Suitable mixing rates can range from about 60 RPM to about 8,500 RPM. In one or more embodiments, the mixing rate can range from a low of about 60 RPM, 100 RPM, or 300 RPM to a high of about 500 RPM, 2,500 RPM, or 8,000 RPM. In one or more embodiments, the mixing rate can range from a low of about 500 RPM, 1,000 RPM, or 2,500 RPM to a high of about 5,500 RPM, 6,500 RPM, or 8,000 RPM. In one or more embodiments, the mixing rate can range from a low of about 100 RPM, 750 RPM, or 1,500 RPM to a high of about 6,500 RPM, 7,500 RPM, or 8,500 RPM. In one or more embodiments, the mixing rate can range from a low of about 5,000 RPM, 5,700 RPM, or 6,000 RPM to a high of about 7,000 RPM, 7,500 RPM, or 7,700 RPM.

In one or more embodiments, the mixing temperature can range from about 40° C. to about 340° C. In one or more embodiments, the mixing temperature can range from about 80° C. to 300° C. In one or more embodiments, the mixing temperature can range from a low of about 30° C., 40° C., or 50° C. to a high of about 70° C., 170° C., or 340° C. In one or more embodiments, the mixing temperature can range from a low of about 80° C., 90° C., or 100° C. to a high of about 120° C., 250° C., or 340° C. In one or more embodiments, the mixing temperature can range from a low of about 85° C., 100° C., or 115° C. to a high of about 270° C., 300° C., or 340° C.

In at least one specific embodiment, 70% to 100% of the one or more elastomers can be mixed at a rate noted above for 20 to 90 seconds, or until the temperature reaches from 40° C. to 60° C. Then, ¾ of the filler, and the remaining amount of elastomer, if any, can be added to the mixer, and mixing can continue until the temperature reaches from 90° C. to 150° C. Next, any remaining filler can be added, as well as processing oil, and mixing can continue until the temperature reaches from 140° C. to 190° C. The finished mixture can then be finished by sheeting on an open mill and allowed to cool to from 60° C. to 100° C. when the curatives are added.

Natural Rubber Blends

The natural rubber blend can include up to 99 wt % and at least 10 wt % natural rubber, 20 wt % natural rubber, 30 wt % natural rubber, 40 wt % natural rubber, or at least 50 wt %. In one or more embodiments, the natural rubber blend can contain of from 30 to 99 wt % natural rubber. In one or more embodiments, the natural rubber blend can contain of from 35 to 90 wt % natural rubber. In one or more embodiments, the natural rubber blend can contain of from 40 to 85 wt % natural rubber. In one or more embodiments, the natural rubber blend can contain of from 40 to 80 wt % natural rubber. In one or more embodiments, the natural rubber blend can contain of from 40 to 60 wt % natural rubber.

In one or more embodiments above or elsewhere herein, the natural rubber blend can include up to 50 wt % propylene copolymer. The amount of the propylene copolymer in the natural rubber blend can also range from a low of about 1 wt %, 5 wt %, or 10 wt % to a high of about 30 wt %, 40 wt %, or 50 wt %. The amount of the propylene copolymer in the natural rubber blend can also range from 2 wt % to 25 wt %; 5 wt % to 20 wt %; 7 wt % to 18 wt %; or 10 wt % to 15 wt %.

In terms of per hundred pounds of rubber (phr), the natural rubber blend can include up to 200 phr propylene copolymer. The amount of the propylene copolymer in the natural rubber blend can also range from a low of about 1, 5, or 10 phr to a high of about 50, 100, or 150 phr. The amount of the propylene copolymer in the natural rubber blend can also range from a low of about 2, 5, or 10 phr to a high of about 20, 25, or 50 phr. The amount of the propylene copolymer in the natural rubber blend can also range from 1 to 50 phr; 2 to 40 phr; 3 to 30 phr; or 4 to 25 phr.

End-Uses

The natural rubber blend can be useful for the fabrication of shaped articles and parts made by using standard elastomer processing techniques like extrusion, calendaring, and molding (e.g., injection or compression molding). Such articles include seals (such as used in building construction or appliances), roofing, tubing, hoses, strips, joints, isolators, wire and cable jackets, medical device components (including syringe parts and catheters), packaging, trays, toys, sporting equipment, furniture, kitchen devices, handles, belts (including power transmission and conveyor belts) and appliance components. Also included are articles for transportation vehicles such as cars, trucks, trains, airplanes, and boats, including weather seals, noise and/or vibration insulation seals and mounts, disks, diaphragms, cups, joints, tubing, hoses, gaskets, o-rings, belts (including synchronous, asynchronous, serpentine, and V belts), wiper blades, mud flaps, skins, mats, boots, bellows, and trim.

In one or more embodiments, the natural rubber blend can be at least partially adhered or otherwise at least partially attached to a second component or substrate to form a composite structure. The second component can be, or include, another natural rubber blend according to one or more embodiments described, an unplasticized natural rubber blend, a thermoset rubber, a thermoplastic resin or plastic, a thermoplastic vulcanizate, or a metal. In one or more embodiments, the two or more structures are at least partially adhered or otherwise at least partially attached to one another to form a composite structure. Illustrative composite structures include, but are not limited to, molded corners, molded end caps, glass run channels, trunk seals, tailgate seals, cowl seals, gap fillers, glass encapsulation, cut line seals, door seals, hood-to-radiator seals, roof line seals, rocker panels, sashes, and belt-line seals.

EXAMPLES

The foregoing discussion can be further described with reference to the following non-limiting examples 1 and 2. Example 1 shows the effect of propylene-ethylene copolymers as a blend component for natural rubber gum stock (Examples T1-T3). For comparative purposes, a first comparative example ("control") is provided to illustrate the effects of the natural gum stock without the propylene-ethylene copolymer(s). Example 2 shows the effect of propylene-ethylene copolymers as a blend component for carbon black reinforced, natural rubber compounds (Examples T1-T8). For comparative purposes, a second comparative example ("control") is also provided to illustrate the effects of carbon black reinforced, natural rubber compounds without the propylene-ethylene copolymer(s).

As shown below, the addition of the propylene-ethylene copolymer(s), according to one or more embodiments herein, into natural rubber gum stock compounds (Examples T1-T3) reduced the peak power consumption by about 12%. This allowed the mixing process to be easy and efficient. There was also a slight increase in Mooney Viscosity of the propylene copolymer/natural rubber blend stocks, but no significant difference in Mooney Scorch and cure time of these propylene copolymer/natural rubber blend stocks in this study.

Each example was prepared by batch compounding on a 1.6 L Banbury mixer, operated at 50 rpm, except the curative for gum stock formulations were blended on a roll mill. The startup temperature was between 48° C. and 55° C. All components were added and allowed to mix for 30 sec before putting the ram down. The Banbury was swept at 90° C., and dumped after mixing for an additional 3.5 to 4.5 minutes, at which point the temperature had reached between 112° C. and 150° C.

The blend components used to prepare the first control example (no propylene copolymer) and Examples T1-T3 are listed below in Table 1. The processing conditions to prepare those compositions are summarized in Table 2 below. Test specimens were compression molded and evaluated using standard testing protocols. Tensile specimens were cured for 20 min at 180° C. Physical properties such as tensile, abrasion, and compression set were measured and are summarized below in Table 3.

TABLE 1

Blend Formulation (phr) for Comparative Example 1 and Examples 1-3

| Compounds | Control | T1 | T2 | T3 |
| --- | --- | --- | --- | --- |
| Natural Rubber SMR20 | 100 | 100 | 100 | 100 |
| Vistamaxx ™-6102 | — | 25 | — | 25 |
| Vistamaxx ™-0602 | — | — | 25 | — |
| ZnO | 5 | 5 | 5 | 5 |
| Stearic Acid | 1 | 1 | 1 | 1 |
| 6PPD (N-(1,3-dimethylbutyl)-N-phenyl-p-phenylenediamine)) | 0.5 | 0.5 | 0.5 | 0.5 |
| Paraffinic Oil-High Viscosity, (Flexon 815) | — | — | — | 5 |
| Sulfur | 2.5 | 2.5 | 2.5 | 2.5 |
| DPG (Diphenylguanidine) | 0.2 | 0.2 | 0.2 | 0.2 |
| MBTS (Dibenzthiazole Disulphide) | 0.6 | 0.6 | 0.6 | 0.6 |
| Total phr | 109.8 | 134.8 | 134.8 | 139.8 |

TABLE 2

Summary of Banbury Conditions

| | Control | T1 | T2 | T3 |
| --- | --- | --- | --- | --- |
| Dump Temp for Masterbatch (° C.) | 116 | 118 | 119 | 121 |
| Power Consumption at peak (KWH) | 391 | 341 | 344 | 361 |

TABLE 3

Summary of Test Physical Properties

| | | Control | T1 | T2 | T3 |
| --- | --- | --- | --- | --- | --- |
| Mooney ML(1 + 8) on MV2000 | | | | | |
| Test temp | [° C.] | 100 | 100 | 100 | 100 |
| Test time | [min] | 8 | 8 | 8 | 8 |
| Preheat | [min] | 1 | 1 | 1 | 1 |
| Init | [MU] | 46 | 57 | 60.8 | 59.1 |
| Mm | [MU] | 30.6 | 36.1 | 30.5 | 35.2 |
| tMm | [min] | 9.0 | 9.0 | 9.0 | 9.0 |
| ML(1 + 4) | [MU] | 31.8 | 37.4 | 32.3 | 36.8 |
| ML(1 + 8) | [MU] | 30.7 | 36.1 | 30.5 | 35.3 |
| Mooney Scorch on MV2000 | | | | | |
| Test temp | [° C.] | 121 | 121 | 121 | 121 |
| Test time | [min] | 30 | 30 | 30 | 30 |
| Preheat | [min] | 1 | 1 | 1 | 1 |
| Mm | [MU] | 25.10 | 25.90 | 21.70 | 25.80 |
| tMm | [min] | 7.78 | 8.15 | 7.63 | 8.40 |
| t1 | [min] | 9.10 | 9.92 | 9.28 | 10.18 |
| t2 | [min] | 9.77 | 10.52 | 9.92 | 10.87 |
| t3 | [min] | 10.17 | 10.97 | 10.35 | 11.28 |
| t5 | [min] | 10.60 | 11.47 | 10.92 | 11.75 |
| t10 | [min] | 11.30 | 12.02 | 11.53 | 12.31 |
| t20 | [min] | 12.01 | 12.72 | 12.11 | 12.93 |
| t35 | [min] | 12.68 | 13.43 | 12.76 | 13.58 |
| Curerate 1 | | 1.50 | 1.67 | 1.58 | 1.46 |
| MDR with curves BRDTC Method | | | | | |
| Test Time | [min] | 30 | 30 | 30 | 30 |
| Test Temp | [° C.] | 160 | 160 | 160 | 160 |
| ML | [dNm] | 0.90 | 0.88 | 0.89 | 0.88 |
| MH | [dNm] | 8.20 | 5.68 | 5.57 | 5.17 |
| MH − ML | [dNm] | 7.30 | 4.80 | 4.68 | 4.29 |
| ts1 | [Min] | 0.84 | 0.98 | 0.95 | 0.98 |
| ts2 | [Min] | 1.01 | 1.29 | 1.29 | 1.38 |
| ts5 | [Min] | 1.95 | — | — | — |
| t10 | [Min] | 0.79 | 0.84 | 0.81 | 0.81 |
| t25 | [Min] | 0.98 | 1.03 | 1.00 | 1.00 |
| t50 | [Min] | 1.41 | 1.47 | 1.44 | 1.46 |
| t75 | [Min] | 2.25 | 2.35 | 2.34 | 2.37 |
| t85 | [Min] | 2.88 | 3.01 | 3.04 | 3.06 |
| t90 | [Min] | 3.37 | 3.52 | 3.57 | 3.60 |
| t95 | [Min] | 4.11 | 4.33 | 4.38 | 4.42 |
| Rh | [dNm/Min] | 5.73 | 3.75 | 3.66 | 3.33 |
| tRh | [Min] | 1.02 | 1.07 | 1.03 | 1.03 |
| Hardness Shore A (Wallace) | | | | | |
| Original | [Shore A] | 40 | 47 | 46 | 44 |
| Aged 100° C., 72 hrs | [Shore A] | 45 | 41 | 43 | 39 |
| Tension 1000 test | | | | | |
| 10 Modulus | [MPa] | 0.31 | 0.46 | 0.40 | 0.40 |
| 20 Modulus | [MPa] | 0.42 | 0.60 | 0.53 | 0.53 |
| 30 Modulus | [MPa] | 0.51 | 0.71 | 0.64 | 0.63 |
| 40 Modulus | [MPa] | 0.58 | 0.80 | 0.72 | 0.71 |
| 50 Modulus | [MPa] | 0.65 | 0.88 | 0.80 | 0.77 |
| 100 Modulus | [MPa] | 0.95 | 1.17 | 1.09 | 1.04 |
| 200 Modulus | [MPa] | 1.56 | 1.75 | 1.63 | 1.55 |
| 300 Modulus | [MPa] | 2.44 | 2.62 | 2.39 | 2.28 |
| 400 Modulus | [MPa] | 4.09 | 4.25 | 3.78 | 3.54 |
| 500 Modulus | [MPa] | 9.40 | 9.30 | 8.01 | 6.95 |
| EnergyToBreak | [J] | 5.87 | 8.53 | 7.32 | 7.29 |
| StressAtBreak | [MPa] | 15.67 | 20.93 | 17.78 | 16.76 |
| % StrainAtBreak | [%] | 560 | 610 | 620 | 630 |
| Tensile 1000 test Aged @ 100° C., 72 hrs | | | | | |
| 10 Modulus | [MPa] | 0.39 | 0.35 | 0.38 | 0.35 |
| 20 Modulus | [MPa] | 0.52 | 0.48 | 0.51 | 0.46 |
| 30 Modulus | [MPa] | 0.64 | 0.58 | 0.61 | 0.55 |
| 40 Modulus | [MPa] | 0.74 | 0.66 | 0.69 | 0.62 |
| 50 Modulus | [MPa] | 0.84 | 0.74 | 0.77 | 0.69 |
| 100 Modulus | [MPa] | 1.28 | 1.06 | 1.09 | 0.98 |
| 200 Modulus | [MPa] | — | 1.78 | 1.78 | 1.64 |
| 300 Modulus | [MPa] | — | 3.03 | 2.93 | 2.78 |
| 400 Modulus | [MPa] | — | 5.96 | 5.31 | 5.53 |
| 500 Modulus | [MPa] | — | — | — | — |
| EnergyToBreak | [J] | 0.30 | 3.04 | 3.65 | 3.26 |
| StressAtBreak | [MPa] | 1.50 | 7.76 | 8.87 | 8.61 |
| % StrainAtBreak | [%] | 120 | 430 | 460 | 450 |
| Tension Set, Method A, 300%, 10 min, Relaxed and value taken after 10 min @ RT | | | | | |
| Tension Set | [%] | 0.1 | 2.6 | 3.8 | 4.0 |
| Density | [g/cc] | 0.977 | 0.948 | 0.949 | 0.947 |

TABLE 4

Summary of Ozone Resistance Testing
Ozone Test - Static

|  |  | Control | T1 | T2 | T3 |
|---|---|---|---|---|---|
| Conc. | [pphm] | 50 | 50 | 50 | 50 |
| Temp | [° C.] | 40 | 40 | 40 | 40 |
| Extension | [%] | 20 | 20 | 20 | 20 |
| Obs - after 2 Hrs |  | NC | NC | NC | NC |
| Obs - after 4 Hrs |  | A1 | NC | NC | NC |
| Obs - after 6 Hrs |  | C1 | NC | NC | NC |
| Obs - after 8 Hrs |  | C3 | A2 | NC | A1 |
| Obs - after 24 Hrs |  | C4 | A3 | A1 | A2 |
| Obs - after 50 Hrs |  | C5 | B4 | B4 | B4 |
| Obs - after 72 Hrs |  | C5 | B4 | B4 | B4 |
| Obs - after 96 Hrs |  | C5 | B5 | B5 | B5 |

Note:

| Number of Cracks | Size and Depth of Cracks |
|---|---|
| A: a small number of cracks | 1: That which can not be seen with the naked eyes but can be confirmed with 10 times magnifying glass. |
| B: a large number of cracks | 2: That which can be confirmed with the naked eyes |
| C: numberless cracks | 3: That which is deep and comparitively large (under 1 mm) Brk = Broken in the grips |
| NC: No Cracks | 4: That which is deep and large (1 mm or over to and excl. 3 mm) |
| CR: Complete Rupture | 5: That which is 3 mm or more or about to severe. |

Figure 2:
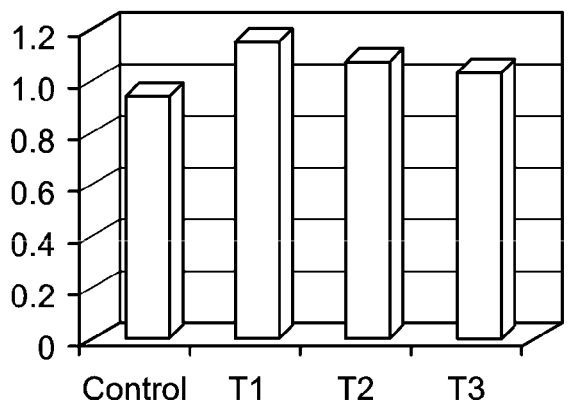
FIG. 2 graphically depicts 100% modulus for the control example and Examples T1-T3.
Figure 3:
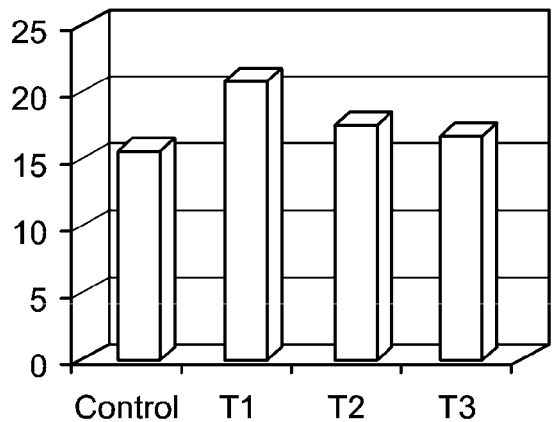
FIG. 3 graphically depicts ultimate tensile strength for the control example and Examples T1-T3.
Figure 4:
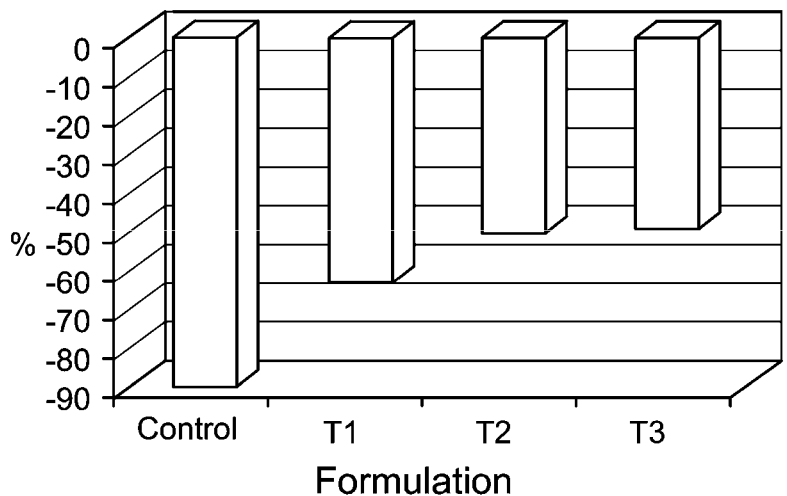
FIG. 4 graphically depicts the ageing effect on tensile strength aged at 100° C., 72 hours, for the control example and Examples T1-T3.
Figure 5:
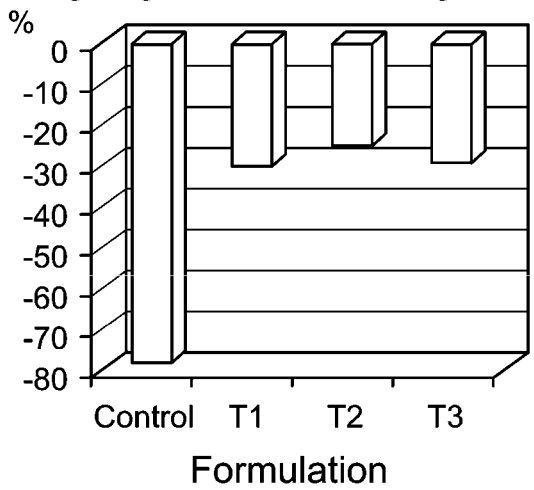
FIG. 5 graphically depicts the ageing effect on ultimate elongation aged at 70° C., 72 hours, for the control example and Examples T1-T3.
Figure 6:
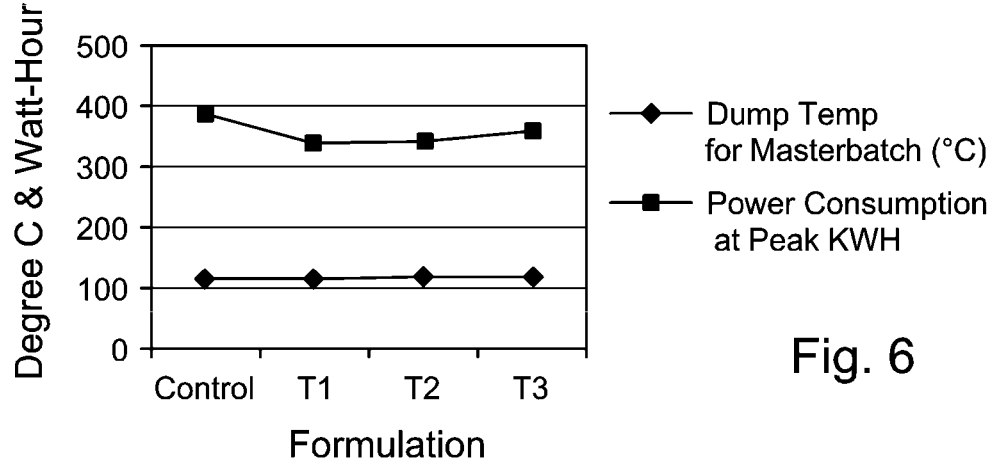
FIG. 6 graphically depicts the dump temperature versus power consumption for the control example and Examples T1-T3.

FIG. 1 graphically depicts ultimate elongation for the control example and Examples T1-T3. FIG. 2 graphically depicts 100% modulus for the control example and Examples T1-T3. FIG. 3 graphically depicts ultimate tensile strength for the control example and Examples T1-T3. FIG. 4 graphically depicts the ageing effect on tensile strength aged at 100° C., 72 hours, for the control example and Examples T1-T3. FIG. 5 graphically depicts the ageing effect on ultimate elongation aged at 70° C., 72 hours, for the control example and Examples T1-T3. FIG. 6 graphically depicts the dump temperature versus power consumption of the first control example and Examples T1-T3.

Figure 7:
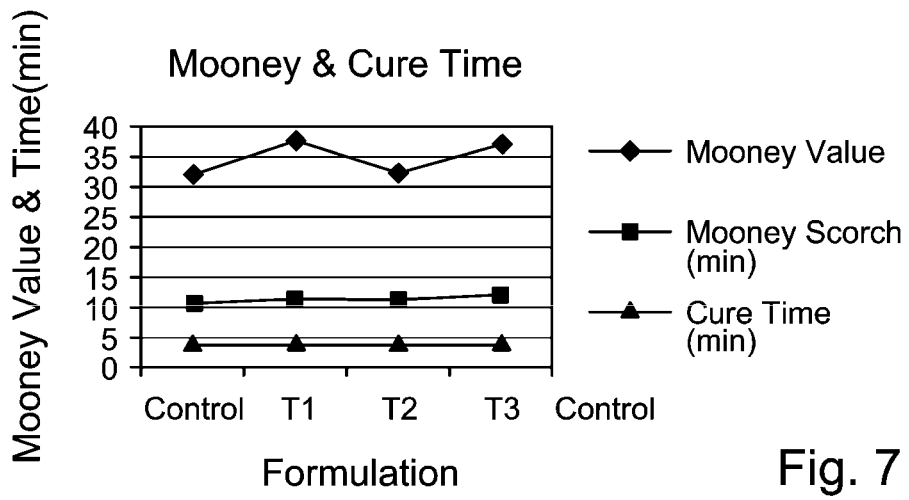
FIG. 7 graphically depicts the Mooney and cure time for the control example and Examples T1-T3.
Figure 8:
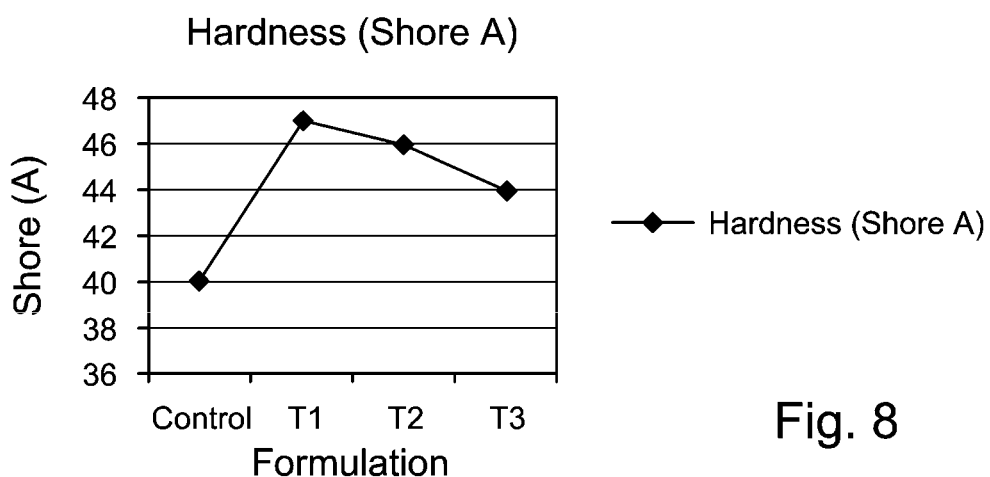
FIG. 8 graphically depicts Shore A hardness for the control example and Examples T1-T3.
Figure 9:
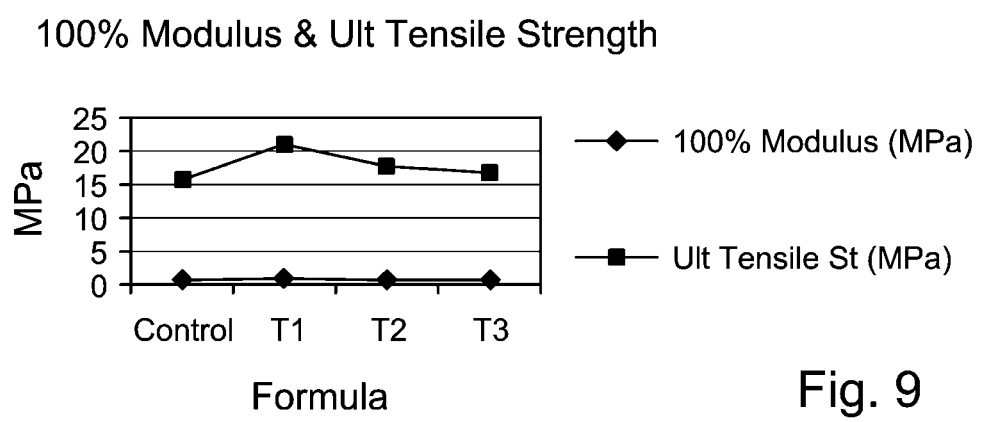
FIG. 9 graphically depicts 100% modulus and ultimate tensile strength for the control example and Examples T1-T3.
Figure 10:
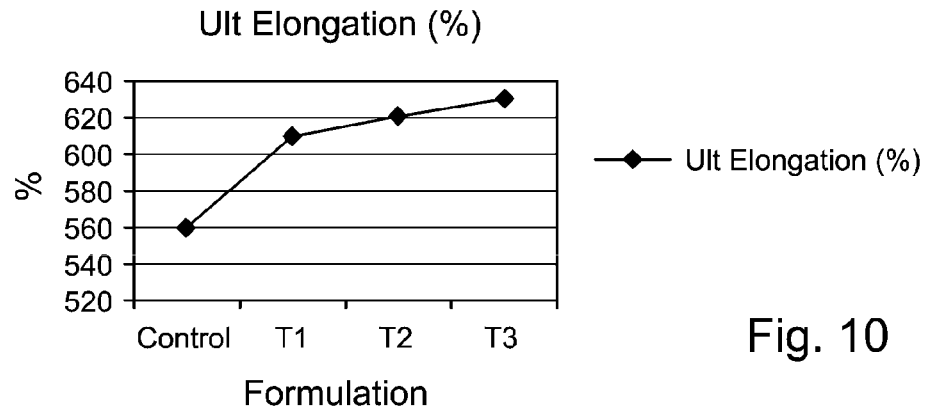
FIG. 10 graphically depicts ultimate elongation for the control example and Examples T1-T3.
Figure 11:
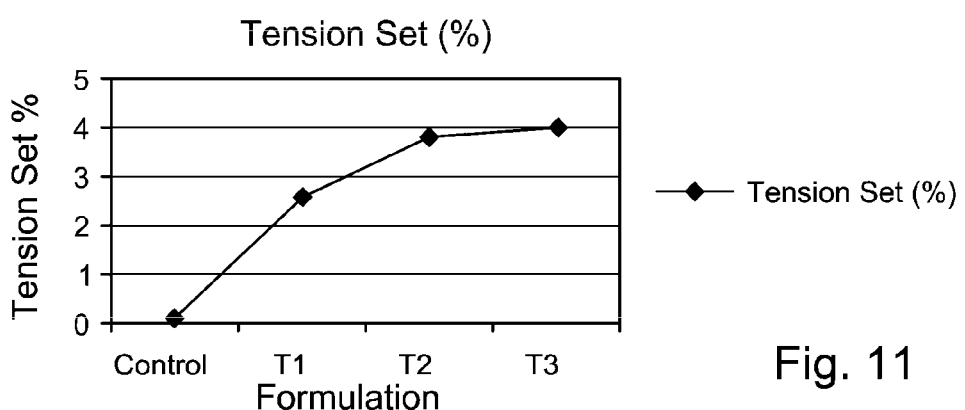
FIG. 11 graphically depicts tension set (%) for the control example and Examples T1-T3.
Figure 12:
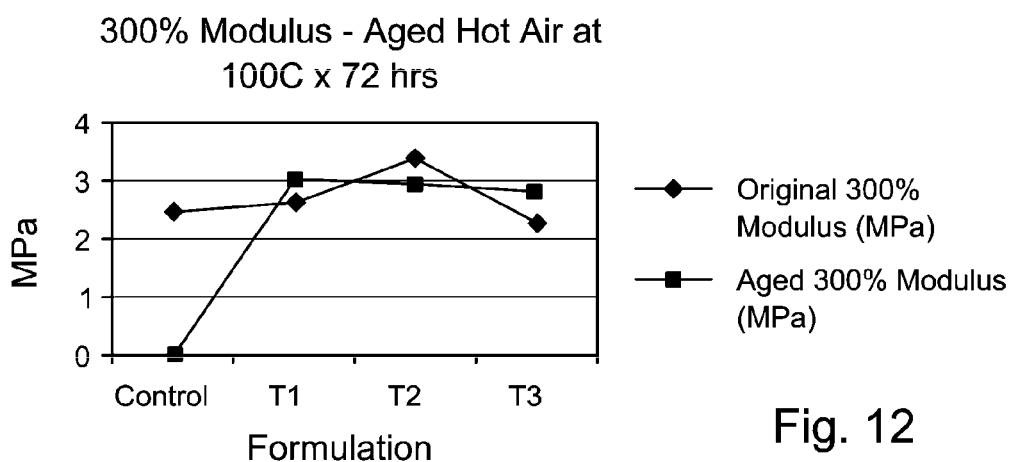
FIG. 12 graphically depicts the ageing effect on 300% modulus, hot air aged at 100° C., 72 hours, for the control example and Examples T1-T3.
Figure 13:
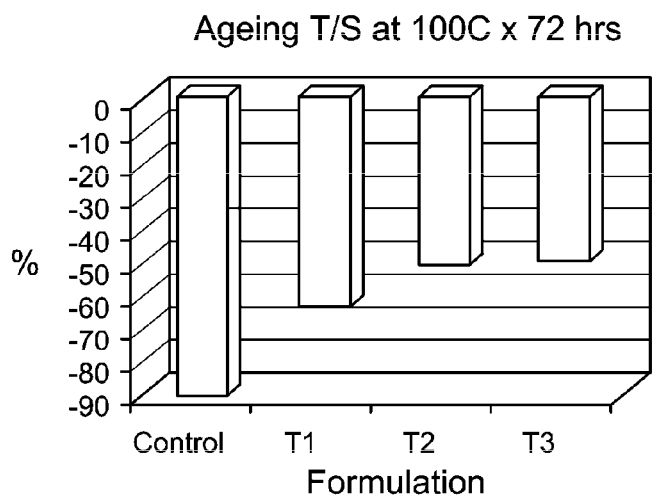
FIG. 13 graphically depicts the ageing effect on tensile strength aged at 100° C., 72 hours, for the control example and Examples T1-T3.
Figure 14:
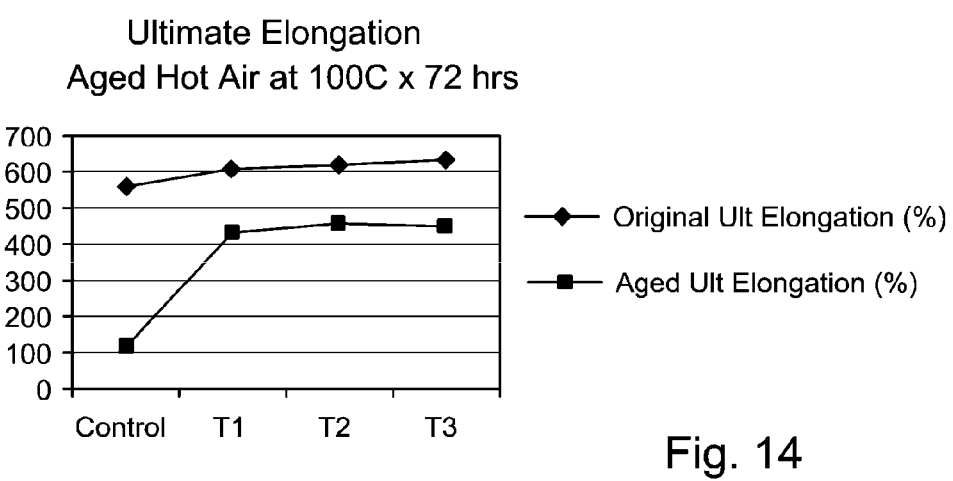
FIG. 14 graphically depicts the ageing effect on ultimate elongation, hot air aged at 100° C., 72 hours, for the control example and Examples T1-T3.
Figure 15:
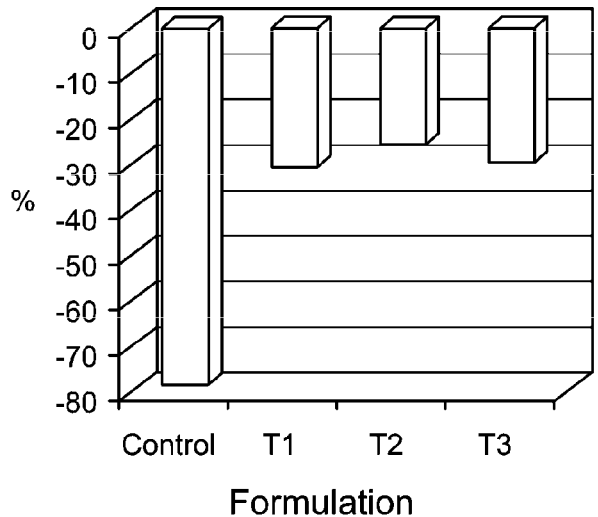
FIG. 15 graphically depicts the ageing effect on ultimate elongation aged at 70° C., 72 hours, for the control example and Examples T1-T3.

FIG. 7 graphically depicts the Mooney and cure time for the control example and Examples T1-T3. FIG. 8 graphically depicts Shore A hardness for the control example and Examples T1-T3. FIG. 9 graphically depicts 100% modulus and ultimate tensile strength for the control example and Examples T1-T3. FIG. 10 graphically depicts ultimate elongation for the control example and Examples T1-T3. FIG. 11 graphically depicts tension set (%) for the control example and Examples T1-T3. FIG. 12 graphically depicts the ageing effect on 300% modulus, hot air aged at 100° C., 72 hours, for the control example and Examples T1-T3. FIG. 13 graphically depicts the ageing effect on tensile strength aged at 100° C., 72 hours, for the control example and Examples T1-T3. FIG. 14 graphically depicts the ageing effect on ultimate elongation, hot air aged at 100° C., 72 hours, for the control example and Examples T1-T3. FIG. 15 graphically depicts the ageing effect on ultimate elongation aged at 70° C., 72 hours, for the control example and Examples T1-T3.

As shown in FIG. 6, the propylene copolymer blends (Examples T1-T3) exhibited lower power consumption peak than the natural rubber without the propylene copolymer blend component (first control example) during mixing. Also shown in the data above and FIGS. 1 through 15, the addition of propylene copolymer into natural rubber provided a lower torque value during compounding. There was also a slight increase in Mooney Viscosity and Scorch time. Hardness, tension set, modulus, ultimate tensile strength and elongation also increased. Most notably, the addition of propylene copolymer into the natural rubber gum stock significantly improved ozone resistance and the hot air ageing properties particularly on ultimate elongation and tensile strength.

Example 2

The blend components used to prepare the carbon black reinforced examples, (Examples T1-T8) and comparative example ("control") are listed below in Table 5. The processing conditions to prepare those compositions are summarized in Table 6 below. Test specimens were compression molded and evaluated using standard testing protocols. Tensile specimens were cured for 20 min at 180° C. Physical properties such as tensile, abrasion, and compression set were measured and are summarized below in Table 7.

TABLE 5

Blend Formulation (phr) for Comparative Example 5 and Examples 6-13

| Compound Number | Control | T1 | T2 | T3 | T4 | T5 | T6 | T7 | T8 |
|---|---|---|---|---|---|---|---|---|---|
| Natural Rubber TSR 10 | 100 | 95 | 90 | 85 | 80 | 95 | 90 | 85 | 80 |
| Carbon Black N 550 | 50 | 50 | 50 | 50 | 50 | 50 | 50 | 50 | 50 |
| Vistamaxx ™- 6102 | — | 5 | 10 | 15 | 20 | — | — | — | — |
| Vistamaxx ™- 3020 | — | — | — | — | — | 5 | 10 | 15 | 20 |
| ZnO | 5 | 5 | 5 | 5 | 5 | 5 | 5 | 5 | 5 |
| Stearic Acid | 2 | 2 | 2 | 2 | 2 | 2 | 2 | 2 | 2 |
| 6PPD | 1 | 1 | 1 | 1 | 1 | 1 | 1 | 1 | 1 |
| Aromatic Oil | 5 | 5 | 5 | 5 | 5 | 5 | 5 | 5 | 5 |
| Sulphur | 2 | 2 | 2 | 2 | 2 | 2 | 2 | 2 | 2 |
| TBBS | 1 | 1 | 1 | 1 | 1 | 1 | 1 | 1 | 1 |
| Total (phr) | 166 | 166 | 166 | 166 | 166 | 166 | 166 | 166 | 166 |

TABLE 6

Summary of Processing Conditions and Parameters

MB Mixing (Mixer: 3.2 Ltr Banbury)

| Start Temp: 50° C. | Time | Addition Order |
|---|---|---|
| Loading %: 75 | 0 min | Polymer |

TABLE 6-continued

Summary of Processing Conditions and Parameters

| RPM: 50 | 1 min | ½ Carbon black + ZnO |
|---|---|---|
| Ram Pressure: 60 PSI | 2 min | ½ CC + Oil + St.A + Others |
| | 3 min | Sweep |
| | 5 min | Dump at 155-162° C. |

Finalization (Mixer: 3.2 Ltr Banbury)

| Start Temp: 39-40° C. | Time | Addition Order |
|---|---|---|
| Loading %: 70 | 0 min | ½MB + Chem. + ½ MB |
| RPM: 25 | 1 min | Sweep |
| Ram Pressure: 60 PSI | 2 min | Dump at 99-105° C. |

Mill Sheets- 6 cross cuts and 6 pig rolls on mill with dwell time of 5 mins

| | T1 | T2 | T3 | T4 | T5 | T6 | T7 | T8 |
|---|---|---|---|---|---|---|---|---|
| Masterbatch Mixing | | | | | | | | |
| Dump Temperature ° C. | 160 | 162 | 160 | 160 | 161 | 160 | 155 | 159 |
| Mixing Time in minutes | 5 | 5 | 5 | 5 | 5 | 5 | 5 | 5 |
| Theoretical Batch wt. | 2682 | 2676 | 2669 | 2656 | 2677 | 2671 | 2666 | 2661 |
| Actual Batch wt. | 2664 | 2675 | 2643 | 2641 | 2650 | 2655 | 2646 | 2651 |
| Power | — | — | — | — | — | — | — | — |
| Finalization Mixing | | | | | | | | |
| Dump Temperature ° C. | 100 | 99 | 102 | 105 | 105 | 105 | 105 | 105 |
| Mixing Time in minutes | 2 | 2 | 2 | 2 | 2 | 2 | 2 | 2 |
| Theoretical Batch wt. | 2519 | 2513 | 2507 | 2495 | 2513.89 | 2509 | 2504 | 2499 |
| Actual Batch wt. | 2520 | 2509 | 2504 | 2474 | 2509.30 | 2502 | 2491 | 2489 |
| Power | 225 | 226 | 225 | 234 | 236 | 244 | 225 | 250 |

TABLE 7

Summary of Test Physical Properties

| | | Control | T1 | T2 | T3 | T4 | T5 | T6 | T7 | T8 |
|---|---|---|---|---|---|---|---|---|---|---|
| Mooney ML(1 + 8) on MV2000/OP-02/100° C./8 min. test time/1 min pre heat | | | | | | | | | | |
| Init | [MU] | 75.7 | 77 | 81.6 | 82.4 | 87.7 | 90.1 | 103.7 | 112.6 | 125.8 |
| Mm | [MU] | 57.8 | 56.8 | 58.2 | 58 | 60.3 | 57.6 | 58.8 | 58.5 | 58 |
| tMm | [Min.] | 9 | 9 | 9 | 9 | 9 | 9 | 8.8 | 9 | 9 |
| ML(1 + 4) | [MU] | 59 | 57.8 | 59.3 | 59.3 | 61.9 | 58.7 | 59.9 | 59.6 | 59.2 |
| ML(1 + 8) | [MU] | 57.8 | 56.8 | 58.2 | 58 | 60.3 | 57.6 | 58.9 | 58.5 | 58 |
| Mooney Scorch on MV2000 OP-02 121° C./30 min test time/1 min pre heat | | | | | | | | | | |
| Mm | [MU] | 49.4 | 47.1 | 47.6 | 45.2 | 45.8 | 48.9 | 49.7 | 48.8 | 48.2 |
| tMm | [min.] | 12.98 | 9.77 | 12.47 | 9.95 | 12.67 | 10.8 | 10.97 | 11.57 | 11.12 |
| t1 | [min.] | 18.4 | 17.05 | 18.12 | 18.7 | 18.65 | 16.63 | 16.85 | 18.33 | 17.2 |
| t2 | [min.] | 20.32 | 19.6 | 20.18 | 20.95 | 20.43 | 18.67 | 18.97 | 20.38 | 19.1 |
| t3 | [min.] | 21.42 | 20.87 | 21.27 | 22.25 | 21.5 | 19.9 | 20.18 | 21.5 | 20.18 |
| t5 | [min.] | 22.7 | 22.28 | 22.55 | 23.6 | 22.63 | 21.2 | 21.38 | 22.78 | 21.37 |
| t10 | [min.] | 24.1 | 23.72 | 23.87 | 25.03 | 23.87 | 22.63 | 22.73 | 24.2 | 22.73 |
| t20 | [min.] | 25.35 | 24.99 | 25.07 | 26.35 | 25.03 | 23.89 | 23.98 | 25.51 | 23.99 |
| t35 | [min.] | 26.36 | 26.04 | 26.08 | 27.47 | 26.03 | 24.95 | 25.06 | 26.65 | 25.06 |
| Curerate 1 | | 0.52 | 0.39 | 0.48 | 0.44 | 0.56 | 0.49 | 0.47 | 0.49 | 0.53 |
| MDR with curves BRDTC Method OP-01 MRD @ 160° C., 30 min | | | | | | | | | | |
| ML | [dNm] | 2.07 | 1.93 | 1.89 | 1.81 | 1.83 | 1.95 | 2 | 1.93 | 1.89 |
| MH | [dNm] | 17.73 | 16.92 | 16.67 | 15.6 | 16.31 | 17.01 | 16.45 | 15.32 | 15.88 |
| MH-ML | [dNm] | 15.66 | 14.99 | 14.78 | 13.79 | 14.48 | 15.06 | 14.45 | 13.39 | 13.99 |
| ts1 | [MIn] | 1.74 | 1.58 | 1.6 | 1.6 | 1.72 | 1.44 | 1.55 | 1.63 | 1.55 |
| ts2 | [Min] | 2.12 | 2.02 | 2.05 | 2.11 | 2.17 | 1.90 | 2.00 | 2.13 | 2.04 |
| ts5 | [Min] | 2.54 | 2.51 | 2.54 | 2.68 | 2.67 | 2.39 | 2.5 | 2.69 | 2.58 |
| t10 | [Min] | 1.99 | 1.84 | 1.86 | 1.83 | 1.96 | 1.71 | 1.79 | 1.84 | 1.78 |
| t25 | [Min] | 2.42 | 2.36 | 2.37 | 2.45 | 2.49 | 2.25 | 2.32 | 2.45 | 2.38 |
| t50 | [Min] | 2.89 | 2.85 | 2.87 | 2.97 | 2.97 | 2.71 | 2.81 | 2.95 | 2.87 |
| t75 | [Min] | 3.62 | 3.6 | 3.63 | 3.75 | 3.71 | 3.39 | 3.56 | 3.69 | 3.61 |
| t85 | [Min] | 4.12 | 4.11 | 4.14 | 4.27 | 4.22 | 3.86 | 4.06 | 4.18 | 4.13 |
| t90 | [Min] | 4.5 | 4.48 | 4.52 | 4.65 | 4.59 | 4.2 | 4.44 | 4.55 | 4.5 |
| t95 | [Min] | 5.08 | 5.06 | 5.1 | 5.23 | 5.15 | 4.72 | 5 | 5.09 | 5.06 |
| Rh | [dNm/Min] | 9.01 | 8.13 | 7.95 | 6.95 | 7.95 | 8.69 | 7.81 | 7.04 | 7.55 |
| tRh | [Min] | 2.62 | 2.62 | 2.62 | 2.72 | 2.75 | 2.51 | 2.57 | 2.74 | 2.66 |
| Mooney ML(1 + 8) on MV2000 | | | | | | | | | | |
| Test temp | [° C.] | 100 | 100 | 100 | 100 | 100 | 100 | 100 | 100 | 100 |
| Test time | [min] | 8 | 8 | 8 | 8 | 8 | 8 | 8 | 8 | 8 |

TABLE 7-continued

Summary of Test Physical Properties

|  |  | Control | T1 | T2 | T3 | T4 | T5 | T6 | T7 | T8 |
|---|---|---|---|---|---|---|---|---|---|---|
| Preheat | [min.] | 1 | 1 | 1 | 1 | 1 | 1 | 1 | 1 | 1 |
| Init | [MU] | 75.7 | 77 | 81.6 | 82.4 | 87.7 | 90.1 | 103.7 | 112.6 | 125.8 |
| Mm | [MU] | 57.8 | 56.8 | 58.2 | 58 | 60.3 | 57.6 | 58.8 | 58.5 | 58 |
| tMm | [Min.] | 9 | 9 | 9 | 9 | 9 | 9 | 8.8 | 9 | 9 |
| ML(1 + 4) | [MU] | 59 | 57.8 | 59.3 | 59.3 | 61.9 | 58.7 | 59.9 | 59.6 | 59.2 |
| ML(1 + 8) | [MU] | 57.8 | 56.8 | 58.2 | 58 | 60.3 | 57.6 | 58.9 | 58.5 | 58 |
|  |  | Mooney Scorch on MV2000 | | | | | | | | |
| Test temp | [° C.] | 121 | 121 | 121 | 121 | 121 | 121 | 121 | 121 | 121 |
| Test time | [min] | 30 | 30 | 30 | 30 | 30 | 30 | 30 | 30 | 30 |
| Preheat | [min] | 1 | 1 | 1 | 1 | 1 | 1 | 1 | 1 | 1 |
| Mm | [MU] | 49.4 | 47.1 | 47.6 | 45.2 | 45.8 | 48.9 | 49.7 | 48.8 | 48.2 |
| tMm | [min.] | 12.98 | 9.77 | 12.47 | 9.95 | 12.67 | 10.8 | 10.97 | 11.57 | 11.12 |
| t1 | [min.] | 18.4 | 17.05 | 18.12 | 18.7 | 18.65 | 16.63 | 16.85 | 18.33 | 17.2 |
| t2 | [min.] | 20.32 | 19.6 | 20.18 | 20.95 | 20.43 | 18.67 | 18.97 | 20.38 | 19.1 |
| t3 | [min.] | 21.42 | 20.87 | 21.27 | 22.25 | 21.5 | 19.9 | 20.18 | 21.5 | 20.18 |
| t5 | [min.] | 22.7 | 22.28 | 22.55 | 23.6 | 22.63 | 21.2 | 21.38 | 22.78 | 21.37 |
| t10 | [min.] | 24.1 | 23.72 | 23.87 | 25.03 | 23.87 | 22.63 | 22.73 | 24.2 | 22.73 |
| t20 | [min.] | 25.35 | 24.99 | 25.07 | 26.35 | 25.03 | 23.89 | 23.98 | 25.51 | 23.99 |
| t35 | [min.] | 26.36 | 26.04 | 26.08 | 27.47 | 26.03 | 24.95 | 25.06 | 26.65 | 25.06 |
| Curerate 1 |  | 0.52 | 0.39 | 0.48 | 0.44 | 0.56 | 0.49 | 0.47 | 0.49 | 0.53 |
|  |  | MDR with curves BRDTC Method | | | | | | | | |
| Test Time | [Min] | 30 | 30 | 30 | 30 | 30 | 30 | 30 | 30 | 30 |
| Test Temp | [° C.] | 160 | 160 | 160 | 160 | 160 | 160 | 160 | 160 | 160 |
| ML | [dNm] | 2.07 | 1.93 | 1.89 | 1.81 | 1.83 | 1.95 | 2 | 1.93 | 1.89 |
| MH | [dNm] | 17.73 | 16.92 | 16.67 | 15.6 | 16.31 | 17.01 | 16.45 | 15.32 | 15.88 |
| MH-ML | [dNm] | 15.66 | 14.99 | 14.78 | 13.79 | 14.48 | 15.06 | 14.45 | 13.39 | 13.99 |
| ts1 | [MIn] | 1.74 | 1.58 | 1.6 | 1.6 | 1.72 | 1.44 | 1.55 | 1.63 | 1.55 |
| ts2 | [Min] | 2.12 | 2.02 | 2.05 | 2.11 | 2.17 | 1.9 | 2 | 2.13 | 2.04 |
| ts5 | [Min] | 2.54 | 2.51 | 2.54 | 2.68 | 2.67 | 2.39 | 2.5 | 2.69 | 2.58 |
| t10 | [Min] | 1.99 | 1.84 | 1.86 | 1.83 | 1.96 | 1.71 | 1.79 | 1.84 | 1.78 |
| t25 | [Min] | 2.42 | 2.36 | 2.37 | 2.45 | 2.49 | 2.25 | 2.32 | 2.45 | 2.38 |
| t50 | [Min] | 2.89 | 2.85 | 2.87 | 2.97 | 2.97 | 2.71 | 2.81 | 2.95 | 2.87 |
| t75 | [Min] | 3.62 | 3.6 | 3.63 | 3.75 | 3.71 | 3.39 | 3.56 | 3.69 | 3.61 |
| t85 | [Min] | 4.12 | 4.11 | 4.14 | 4.27 | 4.22 | 3.86 | 4.06 | 4.18 | 4.13 |
| t90 | [Min] | 4.5 | 4.48 | 4.52 | 4.65 | 4.59 | 4.2 | 4.44 | 4.55 | 4.5 |
| t95 | [Min] | 5.08 | 5.06 | 5.1 | 5.23 | 5.15 | 4.72 | 5 | 5.09 | 5.06 |
| Rh | [dNm/Min] | 9.01 | 8.13 | 7.95 | 6.95 | 7.95 | 8.69 | 7.81 | 7.04 | 7.55 |
| tRh | [Min] | 2.62 | 2.62 | 2.62 | 2.72 | 2.75 | 2.51 | 2.57 | 2.74 | 2.66 |
|  |  | Hardness Shore A (Wallace)/BRDTC - OP - 07/-tc90 + 2 @ 160 C. MDR | | | | | | | | |
| Hardness A | [Shore A] Original | 65 | 66 | 68 | 69 | 73 | 66 | 70 | 72 | 76 |
|  |  | Tensile 1000 Test/OP-03/BPC OP-55/-tc90 + 2 @ 160 C. MDR | | | | | | | | |
| 10Modulus | [MPa] | 0.6 | 0.6 | 0.7 | 0.8 | 0.9 | 0.7 | 0.8 | 0.8 | 1.0 |
| 20Modulus | [MPa] | 1.0 | 1.0 | 1.1 | 1.2 | 1.4 | 1.0 | 1.2 | 1.3 | 1.6 |
| 30Modulus | [MPa] | 1.3 | 1.3 | 1.4 | 1.5 | 1.7 | 1.3 | 1.6 | 1.7 | 2.1 |
| 40Modulus | [MPa] | 1.5 | 1.5 | 1.7 | 1.8 | 2.1 | 1.6 | 1.9 | 2.1 | 2.6 |
| 50Modulus | [MPa] | 1.8 | 1.8 | 1.9 | 2.1 | 2.4 | 1.8 | 2.2 | 2.4 | 3.1 |
| 100Modulus | [MPa] | 3.8 | 3.6 | 3.8 | 4.1 | 4.5 | 3.7 | 4.3 | 4.5 | 5.6 |
| 200Modulus | [MPa] | 9.9 | 9.3 | 9.5 | 9.9 | 10.4 | 9.5 | 10.5 | 10.4 | 12.0 |
| 300Modulus | [MPa] | 16.3 | 15.4 | 15.5 | 15.8 | 16.1 | 15.8 | 16.8 | 16.4 | 17.7 |
| 400Modulus | [MPa] | 22.6 | 21.1 | — | 21.0 | — | 21.0 | — | 21.4 | — |
| 500Modulus | [MPa] | — | — | — | — | — | — | — | — | — |
| Energy To Break | [J] | 13.7 | 11.7 | 10.2 | 12.4 | 11.0 | 13.2 | 12.9 | 12.2 | 12.3 |
| Stress At Break | [MPa] | 24.9 | 22.5 | 20.2 | 22.2 | 19.1 | 23.7 | 21.9 | 21.5 | 21.9 |
| % Strain At Break | [%] | 440 | 420 | 380 | 430 | 365 | 430 | 390 | 405 | 390 |
|  |  | Die B Tear/OP-04/BPC-OP54/-tc90 + 2 @ 160 C. MDR | | | | | | | | |
| Tear Resistance | [N/mm] | 131.5 | 133.7 | 131.9 | 119.0 | 110.7 | 128.7 | 163.0 | 115.8 | 113.2 |

TABLE 8

Summary of Ozone Resistance Testing
Ozone Test - Static/-tc90 + 2 @
160 C. MDR/50 pphm/40° C./20% extension

| Obs - 2 Hrs  | C1 | C1 | C2 | C1 | C2 | C1 | C1 | C1 | B1 |
|---|---|---|---|---|---|---|---|---|---|
| Obs - 4 Hrs  | C1 | C1 | C2 | C1 | C2 | C1 | C1 | C1 | B1 |
| Obs - 6 Hrs  | C1 | C1 | C2 | C1 | C2 | C1 | C1 | C1 | B1 |
| Obs - 8 Hrs  | C2 | C2 | C2 | C2 | C2 | C2 | C2 | C2 | B2 |
| Obs - 24 Hrs | C3 | C3 | C3 | C3 | C3 | C2 | C2 | C2 | B2 |
| Obs - 48 Hrs | C4 | C4 | C4 | C4 | C4 | C4 | C4 | C4 | C4 |
| Obs - 72 Hrs | C4 | C4 | C4 | C4 | C4 | C4 | C4 | C4 | C4 |
| Obs - 96 Hrs | C5 | C5 | C5 | C5 | C5 | C5 | C5 | C5 | C5 |

Note:
Number of Cracks
A: a small number of cracks
B: a large number of cracks
C: numberless cracks
NC: No Cracks
CR: Complete Rupture
Size and Depth of Cracks
1: That which can not be seen with the naked eyes but can be confirmed with 10 times magnifying glass.
2: That which can be confirmed with the naked eyes
3: That which is deep and comparitively large (under 1 mm) Brk = Broken in the grips
4: That which is deep and large (1 mm or over to and excl. 3 mm)
5: That which is 3 mm or more or about to severe.

Figure 16:
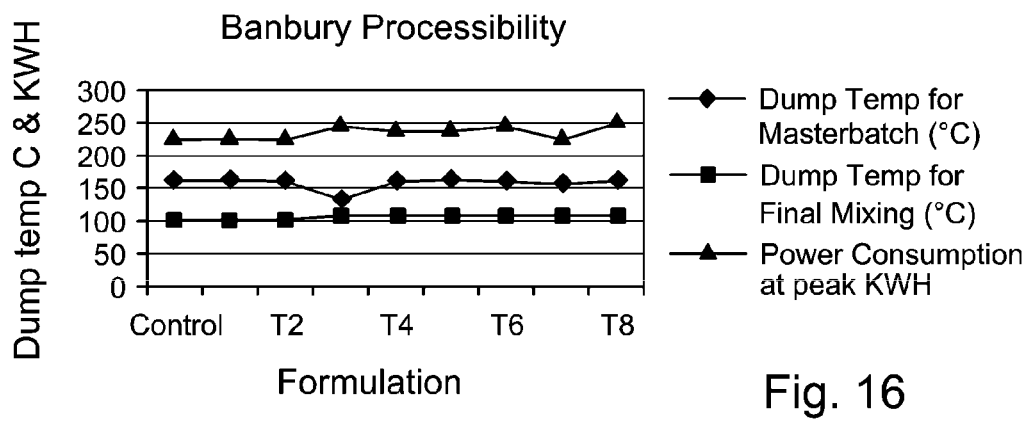
FIG. 16 graphically depicts the Banbury mixer dump temperatures for the second control example and Examples T1-T8.
Figure 17:
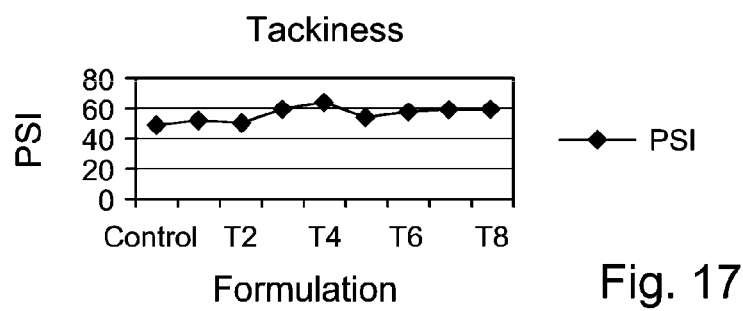
FIG. 17 graphically depicts tackiness for the second control example and Examples T1-T8.
Figure 18:
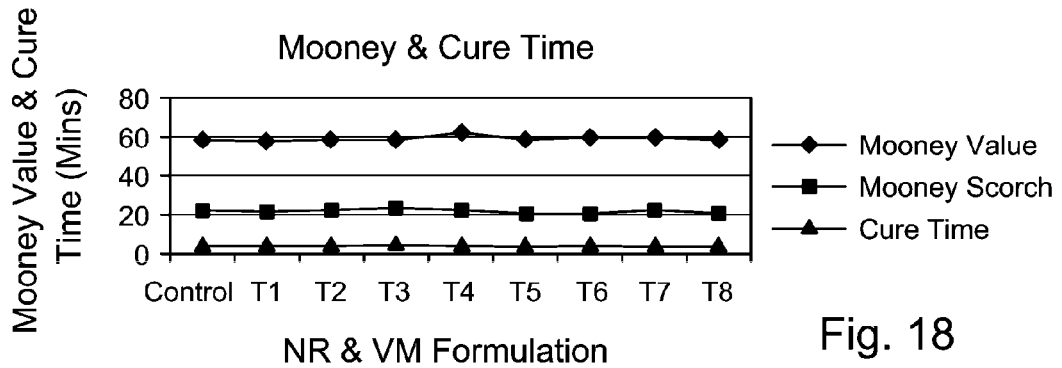
FIG. 18 graphically depicts the Mooney and cure time for the second control example and Examples T1-T8.
Figure 19:
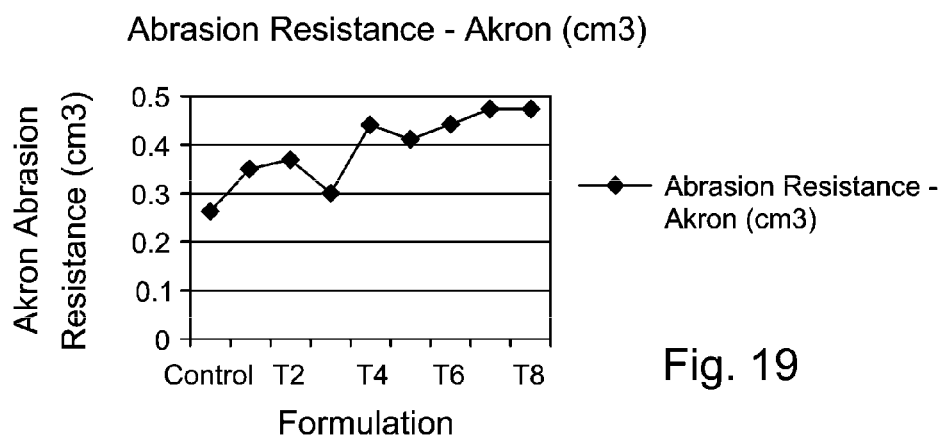
FIG. 19 graphically depicts abrasion resistance for the second control example and Examples T1-T8.
Figure 20:
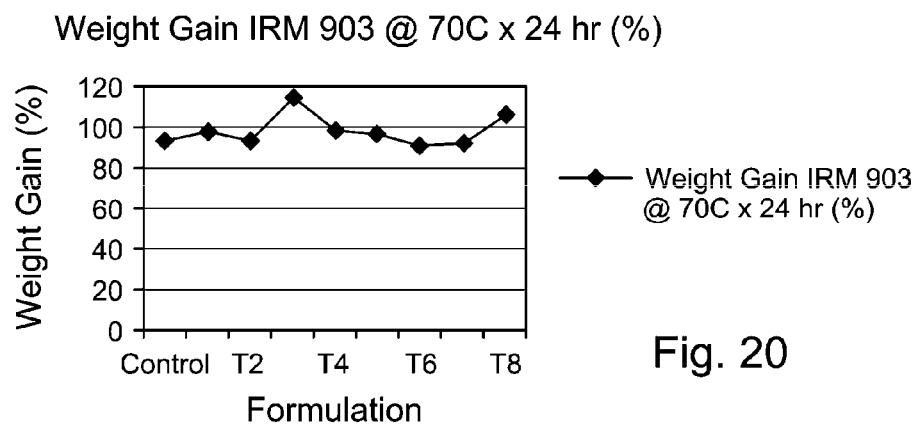
FIG. 20 graphically depicts the percent weight gain at 70° C., 24 hours, for the second control example and Examples T1-T8.
Figure 21:
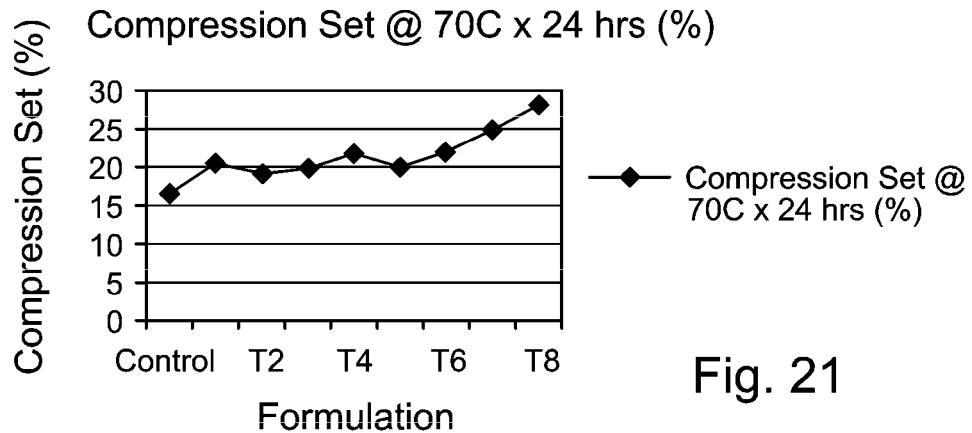
FIG. 21 graphically depicts compression set at 70° C., 24 hours, for the second control example and Examples T1-T8.
Figure 22:
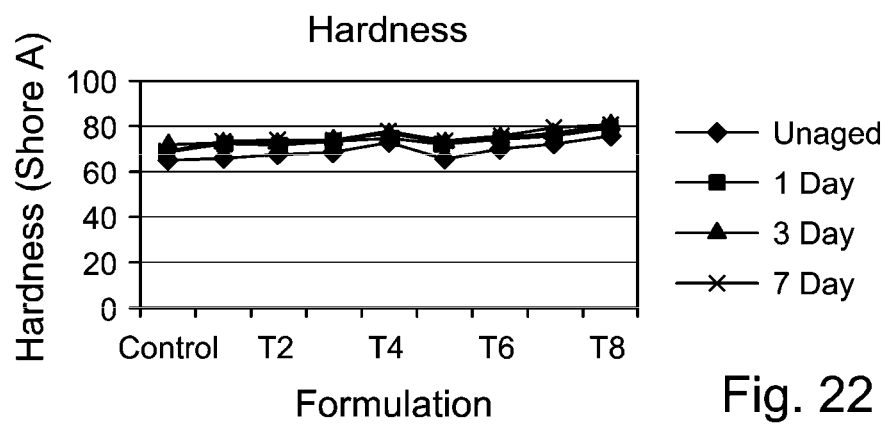
FIG. 22 graphically depicts hardness and ageing effects on hardness for the second control example and Examples T1-T8.
Figure 23:
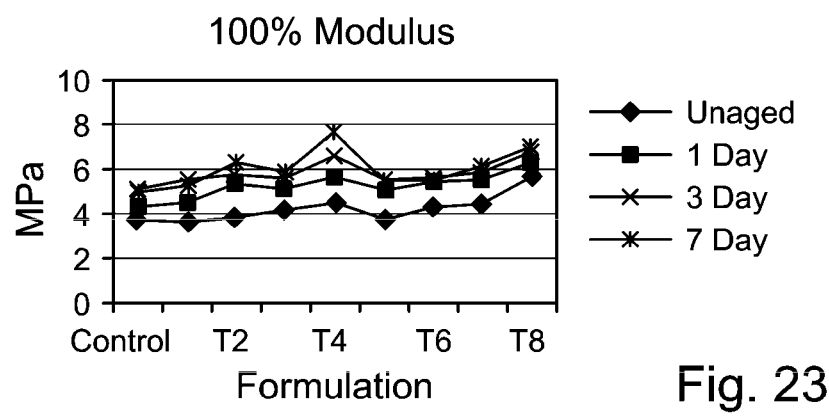
FIG. 23 graphically depicts 100% modulus and ageing effects on 100% modulus for the second control example and Examples T1-T8.
Figure 24:
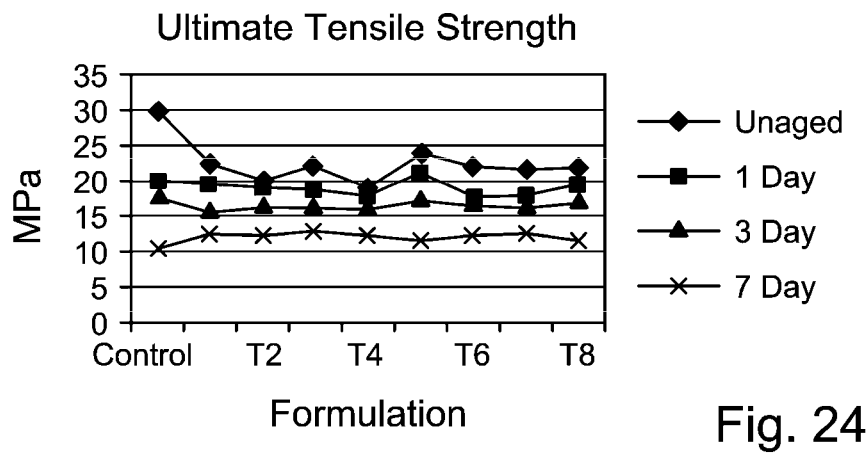
FIG. 24 graphically depicts ultimate tensile strength and ageing effects on ultimate tensile strength for the second control example and Examples T1-T8.
Figure 25:
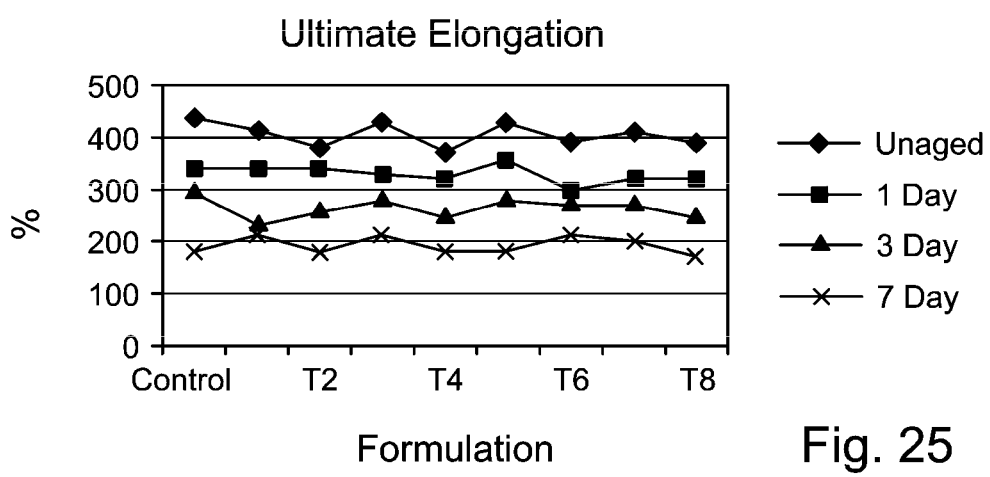
FIG. 25 graphically depicts ultimate elongation and ageing effects on ultimate elongation for the second control example and Examples T1-T8.
Figure 26:
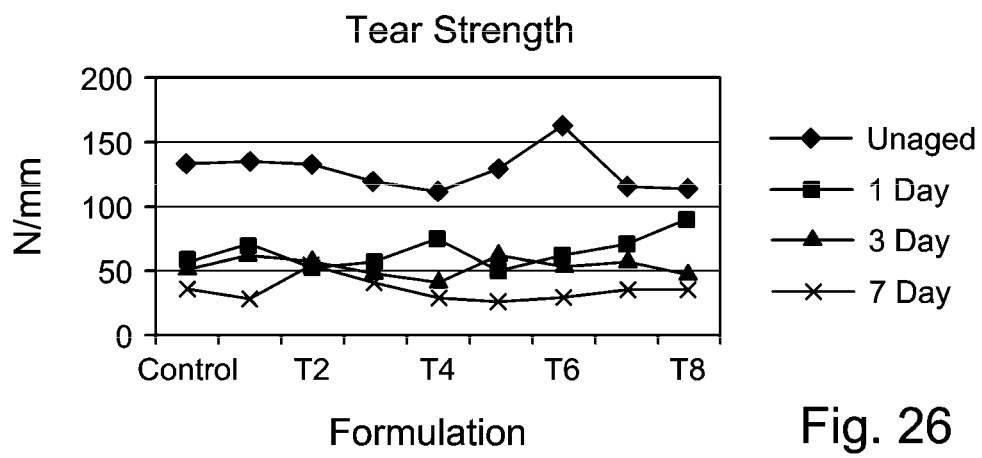
FIG. 26 graphically depicts tear strength and ageing effects on tear strength for the second control example and Examples T1-T8.

FIG. 16 graphically depicts the Banbury mixer dump temperatures for the second control example and Examples T1-T8. FIG. 17 graphically depicts tackiness for the second control example and Examples T1-T8. FIG. 18 graphically depicts the Mooney and cure time for the second control example and Examples T1-T8. FIG. 19 graphically depicts abrasion resistance for the second control example and Examples T1-T8. FIG. 20 graphically depicts the percent weight gain at 70° C., 24 hours, for the second control example and Examples T1-T8. FIG. 21 graphically depicts compression set at 70° C., 24 hours, for the second control example and Examples T1-T8. FIG. 22 graphically depicts hardness and ageing effects on hardness for the second control example and Examples T1-T8. FIG. 23 graphically depicts 100% modulus and ageing effects on 100% modulus for the second control example and Examples T1-T8. FIG. 24 graphically depicts ultimate tensile strength and ageing effects on ultimate tensile strength for the second control example and Examples T1-T8. FIG. 25 graphically depicts ultimate elongation and ageing effects on ultimate elongation for the second control example and Examples T1-T8. FIG. 26 graphically depicts tear strength and ageing effects on tear strength for the second control example and Examples T1-T8.

As shown in the Table 7 above and FIG. 17, the addition of propylene copolymer into the natural rubber with carbon black improved tackiness of the compound. There was no significant difference in Mooney scorch and curing behavior of these blends (FIG. 18). However, these compound blends showed a significant decrease in abrasion resistance (FIG. 19) and compression set properties (FIG. 21). There was a slight increase in hardness, modulus and tensile strength and a slight reduction in ultimate elongation of these blends. See, FIGS. 22-26. In short, the addition of the propylene copolymer into the natural rubber with reinforced filler and delayed action cure system showed a better result in long term ageing as shown by the significant improvement in ultimate tensile strength and elongation.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A natural rubber blend, comprising:
   100 phr natural rubber;
   from about 5 to about 25 phr of one or more propylene-ethylene copolymers consisting of propylene and ethylene, said propylene-ethylene copolymers containing from about 10 to about 16 wt % ethylene and having a melting temperature (Tm) of from 60° C. to 105° C.; a heat of fusion of from about 40 J/g to about 80 J/g; and MFR ASTM-1238D, 2.16 kg, 230° C., of about from 1 g/10 min to about 90 g/10 min;
   wherein (a) aging effect on tensile strength aged at 100° C., 72 h is at least one third less significant on said natural rubber blend than on a blend free of the propylene-ethylene copolymer, but is otherwise identical in terms of its constituents, and (b) aging effect on ultimate elongation aged at 70° C., 72 h is at least one half less significant on said natural rubber blend than on a blend free of the propylene-ethylene copolymer, but is otherwise identical in terms of its constituents.

2. The natural rubber blend of claim 1, further comprising one or more reinforcing fillers.

3. The natural rubber blend of claim 2, wherein the one or more reinforcing fillers is present in an amount of from about 50 phr to about 100 phr.

4. The natural rubber blend of claim 2, wherein the one or more reinforcing fillers comprises carbon black.

5. The natural rubber blend of claim 1, further comprising one or more thermoplastic resins.

6. The natural rubber blend of claim 5, wherein the one or more thermoplastic resins comprises polypropylene.

7. A shaped article consisting essentially of the natural rubber blend of claim 1.

8. A natural rubber blend, comprising:
   100 phr natural rubber;
   from about 5 to about 25 phr of one or more propylene-ethylene copolymers consisting of propylene and ethylene, said propylene-ethylene copolymers containing from about 10 to about 16 wt % ethylene, and having a melting temperature (Tm) of from 60° C. to 105° C.; a heat of fusion of from about 40 J/g to about 80 J/g; and MFR ASTM-1238D, 2.16 kg, 230° C., of from about 1 g/10 min to about 90 g/10 min;
   5 phr of ZnO;
   1 phr of stearic acid;
   0.5 phr of (N-(1,3-dimethylbutyl)-N-phenyl-p-phenylene-diamine);
   0 to 5 phr of paraffinic oil;
   2.5 phr of sulphur;
   0.2 phr of diphenylguanidine; and
   0.6 phr of dibenzothiazole disulphide, wherein (a) aging effect on tensile strength aged at 100° C., 72 h is at least one third less significant on said natural rubber blend than on a blend free of the propylene-ethylene copolymer but is otherwise identical in terms of its constituents, and (b) aging effect on ultimate elongation aged at 70° C., 72 h is at least one half less significant on said natural rubber blend than on a blend free of the propylene-ethylene copolymer, but is otherwise identical in terms of its constituents.

9. A shaped article consisting essentially of the natural rubber blend of claim 8.

10. A natural rubber blend, comprising:
   100 phr natural rubber;
   from about 5 to about 25 phr of one or more propylene-ethylene copolymers consisting of propylene and ethylene, said propylene-ethylene copolymers containing from about 10 to about 16 wt % ethylene, and having a melting temperature (Tm) of from 60° C. to 105° C., a heat of fusion of from about 40 J/g to about 80 J/g, and MFR ASTM-1238D, 2.16 kg, 230° C., of from about 1 g/10 min to about 90 g/10 min;
   50 phr of one or more reinforcing fillers;
   5 phr of ZnO;
   2 phr of stearic acid;
   1 phr of (N-(1,3-dimethylbutyl)-N-phenyl-p-phenylenediamine);
   5 phr of aromatic oil;
   2 phr of sulfur; and
   1 phr of N-tertiarybutyl-2-benzothiazole sulfenamide.

* * * * *